(12) United States Patent
Choi et al.

(10) Patent No.: US 11,575,128 B2
(45) Date of Patent: Feb. 7, 2023

(54) POSITIVE ELECTRODE AND LITHIUM BATTERY INCLUDING THE SAME

(71) Applicants: Samsung Electronics Co., Ltd., Suwon-si (KR); Samsung SDI Co., Ltd., Yongin-si (KR)

(72) Inventors: Hongsoo Choi, Seoul (KR); Hyeokjo Gwon, Hwaseong-si (KR); Soyeon Kim, Suwon-si (KR); Hyunseok Kim, Suwon-si (KR); Wonseok Chang, Seoul (KR)

(73) Assignees: SAMSUNG ELECTRONICS CO., LTD., Gyeonggi-Do (KR); SAMSUNG SDI CO., LD., Gyeonggi-Do (KR)

( * ) Notice: Subject to any disclaimer, the term of this patent is extended or adjusted under 35 U.S.C. 154(b) by 451 days.

(21) Appl. No.: 16/675,359

(22) Filed: Nov. 6, 2019

(65) Prior Publication Data

US 2020/0203723 A1 Jun. 25, 2020

(30) Foreign Application Priority Data

Dec. 21, 2018 (KR) .......................... 10-2018-0167890

(51) Int. Cl.
*H01M 4/38* (2006.01)
*H01M 4/525* (2010.01)
(Continued)

(52) U.S. Cl.
CPC ............. *H01M 4/382* (2013.01); *C08F 12/26* (2013.01); *H01M 4/505* (2013.01); *H01M 4/525* (2013.01);
(Continued)

(58) Field of Classification Search
CPC ...... H01M 4/382; H01M 4/505; H01M 4/525; H01M 10/0525; H01M 10/0565; H01M 2004/027
See application file for complete search history.

(56) References Cited

U.S. PATENT DOCUMENTS 9,203,109 B2 12/2015 Hu et al.
10,205,190 B2 2/2019 Lee et al.
(Continued)

FOREIGN PATENT DOCUMENTS

KR 1020170047661 A 5/2017
KR 101747864 A 6/2017
(Continued)

OTHER PUBLICATIONS

Auvergniot et al., "Interface Stability of Argyrodite Li6PS5Cl toward LiCoO2'LiNi1/3Co1/3Mn1/3O2, and LiMn2O4 in Bulk All-Solid-State Batteries", Chemistry of Materials, 2017, 29, 3883-3890.
(Continued)

*Primary Examiner* — Jayne L Mershon
(74) *Attorney, Agent, or Firm* — Cantor Colburn LLP

(57) ABSTRACT

A positive electrode includes a composite material including a positive active material and a coating layer on a surface of the positive active material, wherein the coating layer includes a copolymer including a first repeating unit represented by Formula 1 below and a second repeating unit represented by Formula 2 below:

(Continued)

Formula 1

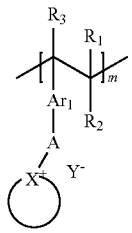

Formula 2

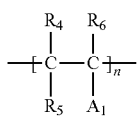

wherein $Ar_1$, $R_1$ to $R_6$, A, $A_1$,

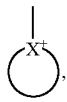

$Y^-$, m, and n are the same as defined in the specification.

24 Claims, 13 Drawing Sheets

(51) Int. Cl.
 *H01M 4/505* (2010.01)
 *H01M 10/0565* (2010.01)
 *H01M 10/0525* (2010.01)
 *C08F 12/26* (2006.01)
 *H01M 4/02* (2006.01)

(52) U.S. Cl.
 CPC ... *H01M 10/0525* (2013.01); *H01M 10/0565* (2013.01); *H01M 2004/027* (2013.01); *H01M 2004/028* (2013.01)

(56) References Cited

U.S. PATENT DOCUMENTS

| | | |
|---|---|---|
| 10,361,425 B2 | 7/2019 | Choi et al. |
| 2017/0117536 A1* | 4/2017 | Choi ............... C08F 12/26 |
| 2017/0301920 A1 | 10/2017 | Liu et al. |
| 2017/0331146 A1* | 11/2017 | Haba ............... H01M 4/663 |
| 2018/0151887 A1 | 5/2018 | Yang et al. |
| 2019/0097232 A1 | 3/2019 | Choi et al. |
| 2019/0221884 A1* | 7/2019 | Utsuno ............. H01B 1/10 |
| 2019/0326631 A1 | 10/2019 | Choi et al. |

FOREIGN PATENT DOCUMENTS

| | | |
|---|---|---|
| KR | 101865382 B1 | 5/2018 |
| KR | 1020190037075 A | 4/2019 |

OTHER PUBLICATIONS

Kato et al, "High-power all-solid-state batteries using sulfide superionic conductors", Nature Energy, vol. 1, 2016, 1-7.

Tan et al., "High enhanced low temperature discharge capacity of LiNi1/3Co2/3Mn1/3O2 with lithium boron oxide glass modification", Journal of Power Sources, 277, 2015, pp. 139-146.

Tatsumisago et al, "Recent development of sulfide solid electrolytes and interfacial modification for all-solid-state rechargeable lithium batteries", Journal of Asian Ceramic Societies, 1, 2013, 17-25.

* cited by examiner

POSITIVE ELECTRODE AND LITHIUM BATTERY INCLUDING THE SAME

CROSS-REFERENCE TO RELATED APPLICATION

This application claims priority to and the benefit of Korean Patent Application No. 10-2018-0167890, filed on Dec. 21, 2018, in the Korean Intellectual Property Office, and all the benefits accruing therefrom under 35 U.S.C. § 119, the content of which is incorporated herein by reference in its entirety.

BACKGROUND

1. Field

The present disclosure relates to a positive electrode and a lithium battery including the positive electrode.

2. Description of the Related Art

In recent years, there has been an increase in market demand for a lithium-based energy storage device applicable to electric vehicle, and which stores a large amount of electrical energy. Accordingly, a lithium battery having high capacity and improved stability has been researched. In particular, a lithium battery including a solid electrolyte storing a large amount of electrical energy, has improved stability, and a decreased risk of explosion by ignition, as compared to a lithium battery including a liquid electrolyte. Research into the commercialization of a sulfide-based electrolyte having excellent ionic conductivity and applicable to fast charging/discharging environments has been conducted. However, there remains a need for a lithium battery having increased operating voltage to energy density.

SUMMARY

Provided is a positive electrode having excellent stability at high temperature and a reduced amount of interfacial side reactions with a solid electrolyte.

Provided is a lithium battery having improved cell performance by including the positive electrode.

Additional aspects will be set forth in part in the description which follows and, in part, will be apparent from the description, or may be learned by practice of the presented embodiments.

According to an aspect of an embodiment, a positive electrode includes a composite material including a positive active material and a coating layer on a surface of the positive active material, wherein the coating layer includes a copolymer including a first repeating unit represented by Formula 1 below, and a second repeating unit represented by Formula 2 below:

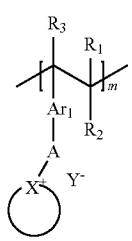

Formula 1 wherein in Formula 1, $Ar_1$ is a substituted or unsubstituted C6-C30 arylene group or a substituted or unsubstituted C6-C30 heteroarylene group, $R_1$, $R_2$, and $R_3$ are each independently hydrogen, a substituted or unsubstituted C1-C30 alkyl group, a substituted or unsubstituted C6-C30 aryl group, or a substituted or unsubstituted C3-C30 heteroaryl group, A is a bond, a substituted or unsubstituted C1-C30 alkylene group, a substituted or unsubstituted C6-C30 arylene group, a substituted or unsubstituted C3-C30 heteroarylene group, a substituted or unsubstituted C4-C30 cycloalkylene group, or a substituted or unsubstituted C3-C30 heterocycloalkylene group,

is a 3-membered to 31-membered ring system including 2 to 30 carbon atoms, and X is —S, —N(R), or —P(R'), wherein R and R' are each independently hydrogen, a substituted or unsubstituted C1-C30 alkyl group, a substituted or unsubstituted C1-C30 heteroalkyl group, a substituted or unsubstituted C1-C30 alkoxy group, a substituted or unsubstituted C6-C30 aryl group, a substituted or unsubstituted C7-C30 arylalkyl group, a substituted or unsubstituted C6-C30 aryloxy group, a substituted or unsubstituted C3-C30 heteroaryl group, a substituted or unsubstituted C4-C30 heteroarylalkyl group, a substituted or unsubstituted C3-C30 cycloalkyl group, a substituted or unsubstituted C2-C30 alkenyl group, or a substituted or unsubstituted C3-C30 alkynyl group, and $Y^-$ is an anion,

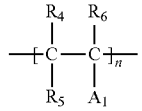

Formula 2 wherein in Formula 2, $A_1$ is a substituted or unsubstituted C6-C30 aryl group, a substituted or unsubstituted C2-C30 heteroaryl group, or —C(=O)O—$(CH_2CH_2O)_a$—$R_7$, wherein $R_7$ is hydrogen, a substituted or unsubstituted C1-C30 alkyl group, or a substituted or unsubstituted C6-C30 aryl group, and a is an integer of 1 to 10, and $R_4$, $R_5$, and $R_6$ are each independently hydrogen, a substituted or unsubstituted C1-C30 alkyl group, a substituted or unsubstituted C6-C30 aryl group, or a substituted or unsubstituted C3-C30 heteroaryl group, and in Formulae 1 and 2, m and n are mole fractions of the first repeating unit represented by Formula 1 and the second repeating unit represented by Formula 2, respectively, wherein a sum of m and n is 1, and m and n are each greater than 0 and less than 1.

According to an aspect of another embodiment, a lithium battery includes the positive electrode, a negative electrode, and a solid electrolyte interposed between the positive electrode and the negative electrode, and including a sulfide solid electrolyte, an oxide solid electrolyte, or a combination thereof.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
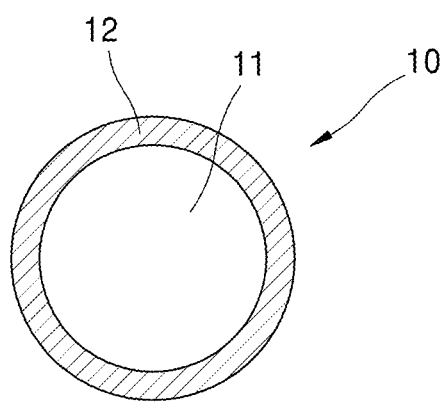
FIG. 1A is a diagram schematically illustrating a structure of a composite positive active material according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a positive electrode and a lithium battery including the same according to embodiments of the present disclosure will be described in detail.

A lithium battery including a solid electrolyte stores a large amount of electrical energy, has improved stability, and has a decreased risk of explosion by ignition, as compared to a lithium battery including a liquid electrolyte. An example of such a solid electrolyte includes a sulfide-based electrolyte having excellent ionic conductivity and applicable to fast charging/discharging environments.

A positive electrode according to an embodiment includes a composite material (also referred to herein as a composite positive active material) including a positive active material and a coating layer on a surface of the positive active material, wherein the coating layer includes a copolymer including a first repeating unit represented by Formula 1 below, and a second repeating unit represented by Formula 2 below.

Formula 1

In Formula 1, Ar$_1$ is a substituted or unsubstituted C6-C30 arylene group or a substituted or unsubstituted C6-C30 heteroarylene group, R$_2$ and R$_3$ are each independently hydrogen, a substituted or unsubstituted C1-C30 alkyl group, a substituted or unsubstituted C6-C30 aryl group, or a substituted or unsubstituted C3-C30 heteroaryl group, A is a bond, a substituted or unsubstituted C1-C30 alkylene group, a substituted or unsubstituted C6-C30 arylene group, a substituted or unsubstituted C3-C30 heteroarylene group, a substituted or unsubstituted C4-C30 cycloalkylene group, or a substituted or unsubstituted C3-C30 heterocycloalkylene group,

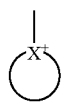

is a 3-membered to 31-membered ring system including 2 to 30 carbon atoms,

X is —S, —N(R), or —P(R'),

R and R' are each independently hydrogen, a substituted or unsubstituted C1-C30 alkyl group, a substituted or unsubstituted C1-C30 heteroalkyl group, a substituted or unsubstituted C1-C30 alkoxy group, a substituted or unsubstituted C6-C30 aryl group, a substituted or unsubstituted C7-C30 arylalkyl group, a substituted or unsubstituted C6-C30 aryloxy group, a substituted or unsubstituted C3-C30 heteroaryl group, a substituted or unsubstituted C4-C30 heteroarylalkyl group, a substituted or unsubstituted C3-C30 cycloalkyl group, a substituted or unsubstituted C2-C30 alkenyl group, or a substituted or unsubstituted C3-C30 alkynyl group, and Y⁻ is an anion.

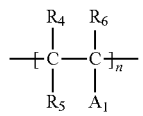

Formula 2

In Formula 2, $A_1$ is a substituted or unsubstituted C6-C30 aryl group, a substituted or unsubstituted C2-C30 heteroaryl group, or —C(=O)O—(CH$_2$CH$_2$O)$_a$—R$_7$, wherein $R_7$ is hydrogen, a substituted or unsubstituted C1-C30 alkyl group, or a substituted or unsubstituted C6-C30 aryl group, and a is an integer of 1 to 10, $R_4$, $R_5$, and $R_6$ are each independently hydrogen, a substituted or unsubstituted C1-C30 alkyl group, a substituted or unsubstituted C6-C30 aryl group, or a substituted or unsubstituted C3-C30 heteroaryl group.

In Formulae 1 and 2, m and n are mole fractions of the first repeating unit represented by Formula 1 and the second repeating unit represented by Formula 2, respectively, a sum of m and n is 1, and m and n are each independently greater than 0 and less than 1.

In the first repeating unit represented by Formula 1, $Ar_1$ may be an arylene or heteroarylene group as described above. A copolymer including a first repeating unit represented by Formula 1 and including such an arylene group or heteroarylene group, has excellent mechanical properties due to π-π interaction of the arylene group or the heteroarylene group. In Formula 1, when $Ar_1$ is an aliphatic group such as an alkylene group or an aliphatic group such as a bivalent aliphatic ring, the mechanical properties of the copolymer may be deteriorated as compared with a copolymer in which $Ar_1$ is an arylene group or a heteroarylene group.

When used in a lithium battery, a sulfide-based solid electrolyte has a relatively high ionic conductivity. The sulfide-based solid electrolyte may also have relatively lower thermal runway caused by exothermic reactions, and a decreased risk of explosion caused thereby. However, when used with a positive active material capable of storing a large amount of electrical energy, the sulfide-based solid electrolyte reacts with a surface of the positive active material at a high voltage causing deterioration in the cycle characteristics and reduction of capacity in the lithium battery. To improve the cycle characteristics and capacity of the lithium battery, a metal oxide, such as Al$_2$O$_3$ or LiNbO$_3$, as a coating layer on a positive active material have been suggested to facilitate transfer of lithium ions and improve stability at a high voltage. However, when the metal oxide is used as the material forming the coating layer on the positive active material, a heat treatment step performed at a high temperature after introducing the coating layer, is used to obtain sufficient ionic conductivity. During this process, metal ions are complexed with the positive electrode material and the positive electrode material is deformed, thereby deteriorating the capacity and cycle characteristics. Also, the metal oxide coating layer formed on the positive active material has a very high coefficient of elasticity, and thus may break due to volume changes in the positive electrode caused by repeated charge and discharge processes, thereby resulting in rapid deterioration in performance.

Accordingly, it has been advantageously discovered that a composite positive active material including a positive active material and a coating layer formed on the surface of the positive active material, has excellent stability at a high voltage, excellent mechanical properties, and increased elasticity capable of preventing deformation of the coating layer even in a volume changing environment. In addition, the composite positive active material is able to effectively inhibit side reactions between the sulfide-based solid electrolyte and the positive electrode. For example, the coating layer of the composite positive active material includes a copolymer containing a polymeric ionic liquid (PIL) having lithium ion conductivity.

As shown in FIG. 1, the a composite positive active material 10 includes a positive active material 11 and a coating layer 12 formed on the surface of the positive active material. The positive active material 11 may be considered a core material of the composite positive active material 10, and the coating layer 12 may be considered a shell of the composite positive active material 10.

In the copolymer, the first repeating unit of Formula 1 is a monomer containing a polymeric ionic liquid including positive-negative charge pairs, and which provides charge stability at a high voltage, and the second repeating unit of Formula 2 is a monomer providing excellent mechanical properties. Because the copolymer has lithium ion conductivity and elasticity, deformation of the coating layer caused by volume changes in the positive electrode under repeated charge/discharge cycle conditions may be prevented. By using the copolymer as a material for forming a coating layer on the positive active material, an oxidation reaction between the solid electrolyte and the positive active material is suppressed due to minimal contact between the sulfide-based solid electrolyte and the positive active material. Due to the decreased number of interfacial side reactions, a passage for effectively transferring lithium ions is provided, and the positive active material is not broken or damaged by volume changes thereof. Therefore, a lithium battery having excellent cycle characteristics and high energy density may be manufactured.

In Formula 1, $Ar_1$ includes a phenylene group, a biphenylene group, a naphthalenylene group, a phenanthrenylene group, a triphenlylenylene group, an anthracenylene group, a fluorenylene group, or a carbazolylene group. For example, $Ar_1$ is one of the groups represented by Formula 3-1, Formula 3-2, Formula 3-3, Formula 3-3, Formula 3-4, or Formula 3-5 below.

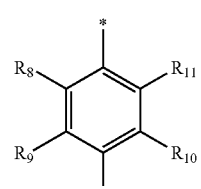

Formula 3-1

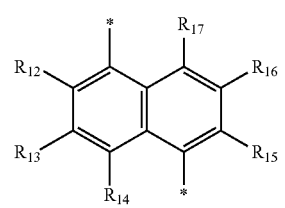

Formula 3-2

Formula 3-3

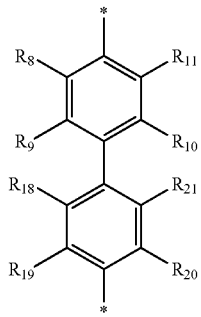

Formula 3-4

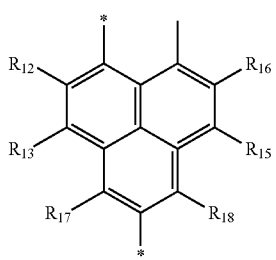

Formula 3-5

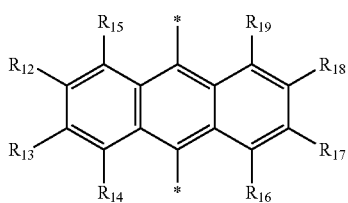

In Formula 3-1, Formula 3-2, Formula 3-3, Formula 3-4, and Formula 3-5, * is a point of attachment, $R_{11}$ to $R_{20}$ are each independently hydrogen, a substituted or unsubstituted C1-C30 alkyl group, a substituted or unsubstituted C6-C30 aryl group, or a substituted or unsubstituted C3-C30 heteroaryl group.

In Formula 1,

may be a 3-membered to 31-membered ring system, and may be a monocyclic or multicyclic system, e.g., bicyclic, tricyclic, or more. For example,

of Formula 1 may be an aliphatic ring or an imidazole ring that is a nitrogen-containing aromatic ring. For example,

may be an aliphatic ring. Since the

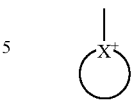

group included in the copolymer forms an aliphatic ring, the copolymer may be more stable across a wider voltage range than an ionic liquid polymer including an aromatic ring, thereby providing a wider electrochemical window. For example, in Formula 1, the

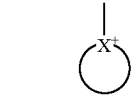

may include a group is selected from groups represented by Formula 4-1, Formula 4-2, Formula 4-3, Formula 4-4, or Formula 4a below.

Formula 4-1

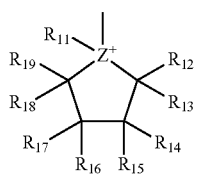

Formula 4-2

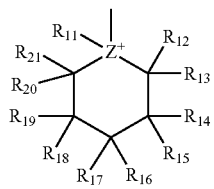

Formula 4-3

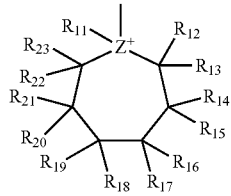

Formula 4-4

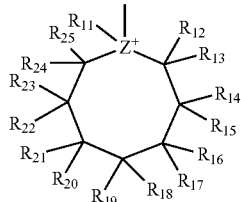

In Formula 4-1, Formula 4-2, Formula 4-3, and Formula 4-4, Z is S, N, or P, and $R_{11}$ to $R_{25}$ are each independently hydrogen, a substituted or unsubstituted C1-C30 alkyl group, a substituted or unsubstituted C1-C30 alkoxy group, a substituted or unsubstituted C6-C30 aryl group, a substituted or unsubstituted C6-C30 aryloxy group, a substituted or unsubstituted C3-C30 heteroaryl group, a substituted or unsubstituted C3-C30 heteroaryloxy group, a substituted or unsubstituted C4-C30 cycloalkyl group, or a substituted or unsubstituted C3-C30 heterocycloalkyl group, and $R_{11}$ is absent when Z is S.

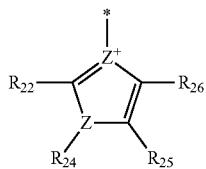

Formula 4a

In Formula 4a, Z is N, and $R_{22}$ to $R_{26}$ are defined the same as described above for $R_{11}$ to $R_{25}$ of Formula 4-1, Formula 4-2, Formula 4-3, and Formula 4-4.

In Formula 1,

includes a group represented by Formula 5-1 or Formula 5-2 below, and $Y^-$ includes $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $CF_3SO_2)_2N^-$, $NO_3^-$, $Al_2Cl_7^-$, $ASF_6^-$, $SbF_6^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

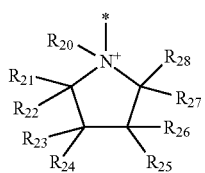 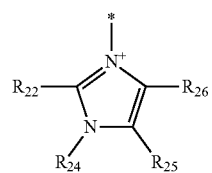

Formula 5

In Formula 5-1 or Formula 5-2, $R_{20}$ to $R_{28}$ are each independently hydrogen, a substituted or unsubstituted C1-C30 alkyl group, a substituted or unsubstituted C1-C30 alkoxy group, a substituted or unsubstituted C6-C30 aryl group, a substituted or unsubstituted C6-C30 aryloxy group, a substituted or unsubstituted C3-C30 heteroaryl group, a substituted or unsubstituted C3-C30 heteroaryloxy group, a substituted or unsubstituted C4-C30 cycloalkyl group, or a substituted or unsubstituted C3-C30 heterocycloalkyl group. $R_{20}$ to $R_{28}$ may be each independently an unsubstituted C3-C10 alkyl group.

In the coating layer of the composite positive active material, according to an embodiment, an amount of the copolymer is in the range of about 0.1 parts by weight to about 10 parts by weight, for example, about 0.5 parts by weight to about 8 parts by weight, for example, about 0.6 parts by weight to about 3 parts by weight, based on 100 parts by weight of the positive electrode.

Also, an amount of the copolymer is in the range of about 0.1 parts by weight to about 10 parts by weight, for example, about 0.5 parts by weight to about 8 parts by weight, for example, about 0.6 parts by weight to about 3 parts by weight based on 100 parts by weight of a total weight of the coating layer.

When the amount of the copolymer in the coating layer is in the above-described ranges, the effect of inhibiting an interfacial side reaction between the positive electrode and the solid electrolyte is improved, thereby improving stability at a high voltage.

A mixing ratio of the first repeating unit represented by Formula 1 to the second repeating unit represented by Formula 2 (m:n) is in the range of about 1:99 to about 99:1, for example, about 1:9 to about 9:1, for example, about 2:8 to about 8:2, for example, about 2:8 to about 5:5. The mixing ratio refers to a molar ratio. When the mixing ratio of the first and second repeating units is within the ranges described above, a positive electrode having excellent ionic conductivity may be manufactured without reducing mechanical strength.

The copolymer has a degree of polymerization of about 10 to about 5,000, or about 50 to about 4,500, or about 100 to about 4,000.

The first repeating unit represented by Formula 1 may be one of repeating units represented by Formula 16-1, Formula 16-2, Formula 16-3, or Formula 16-4 below.

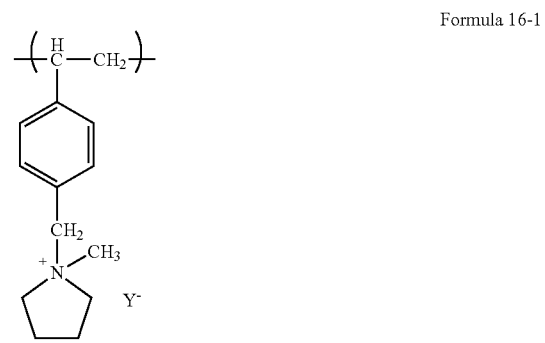

Formula 16-1

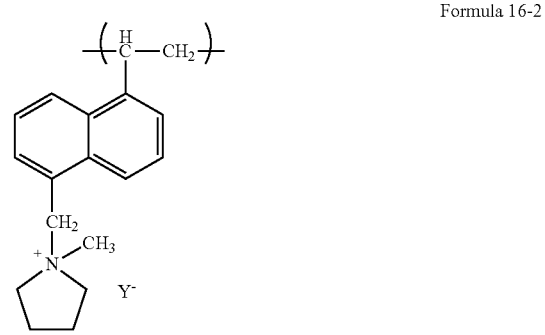

Formula 16-2

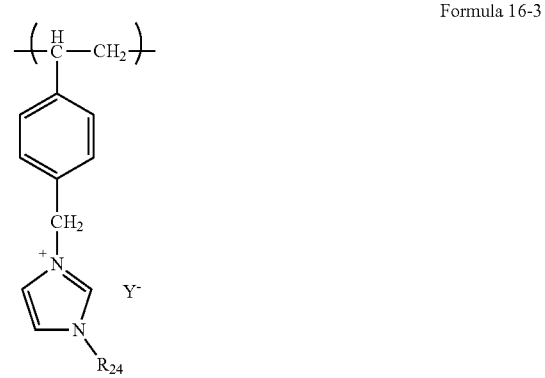

Formula 16-3

Formula 16-4

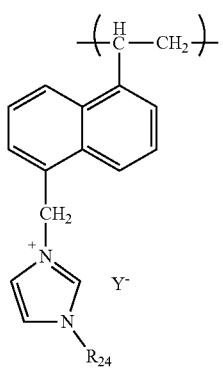

In Formula 16, $R_{24}$ is hydrogen, a C1-C30 alkyl group, a C1-C30 alkoxy group, a C6-C30 aryl group, a C6-C30 aryloxy group, a C3-C30 heteroaryl group, a C3-C30 heteroaryloxy group, a C4-C30 cycloalkyl group, or a C3-C30 heterocycloalkyl group, and $Y^-$ includes $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $(C_2F_6SO_2)(CF_3SO_2)N^-$, $(CF_3SO_2)_2N^-$, $NO_3^-$, $Al_2Cl_7^-$, $ASF_6^-$, $SbF_6^-$, $CH_3COO^-$, $(CF_3SO_2)_3C^-$, $(CF_3)_2PF_4^-$, $(CF_3)_3\ PF_3^-$, $(CF_3)_4PF_2^-$, $(CF_3)_5PF^-$, $(CF_3)_6P^-$, $SF_6CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

The copolymer includes at least one compounds represented by Formulae 8 to 15 below, and the degree of polymerization of the copolymer is about 10 to about 5,000.

Formula 8

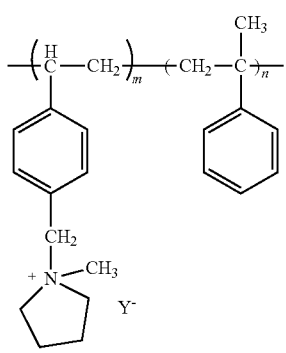

Formula 9

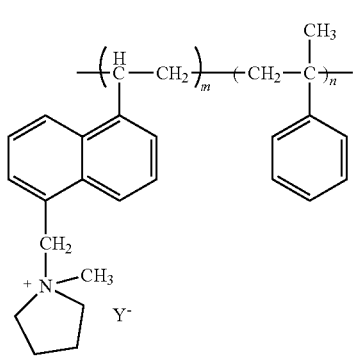

Formula 10

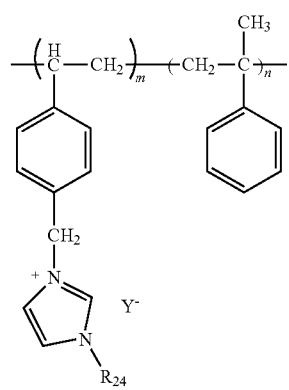

Formula 11

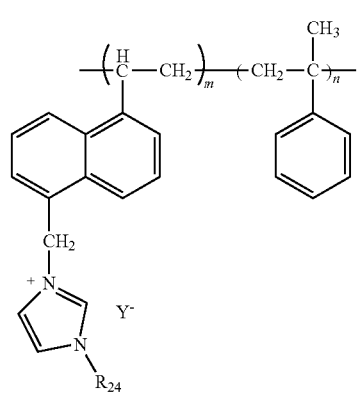

Formula 12

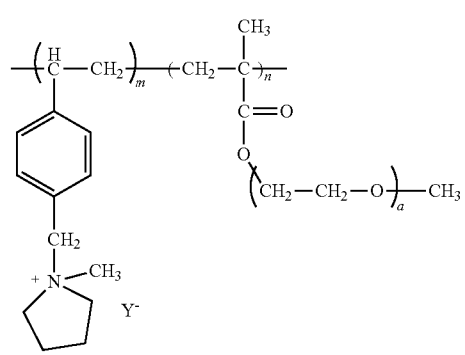

Formula 13

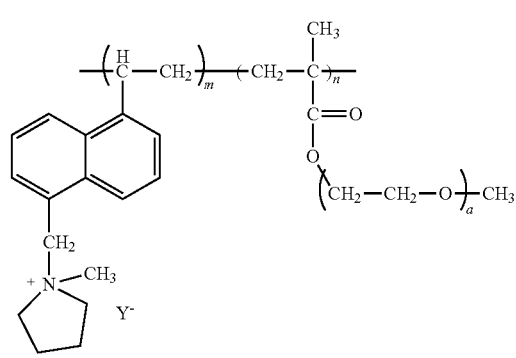

Formula 14

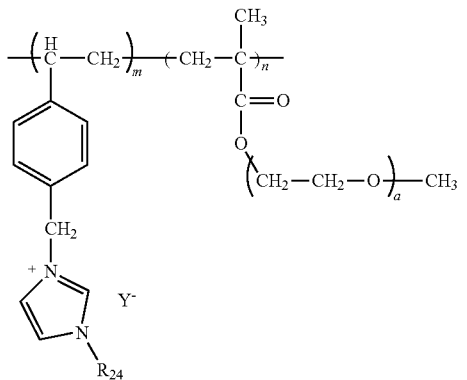

Formula 15

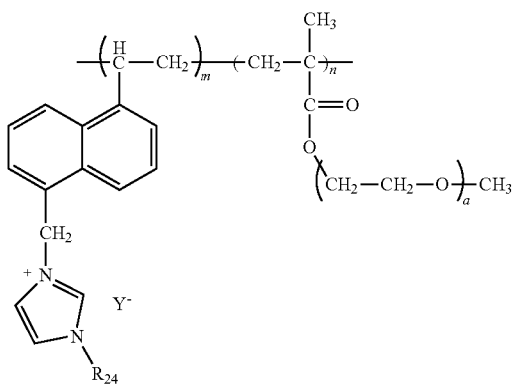

In Formulas 8 to 15, $Y^-$ includes $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^{2-}$, $ClO_4^-$, $CF_3SO_3^-$, $CF_3CO_2^-$, $(C_2F_5SO_2)_2N^-$, $(C_2F_5SO_2)(CF_3SO_2)N^-$, $(FSO_2)_2N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof, a is an integer of 1 to 10, and $R_{24}$ is a C1-C10 alkyl group, m and n are each independently 0.01 to 0.99, and the degree of polymerization of the copolymer is 10 to 5000.

In Formulae 8 to 15, a molar ratio of m to n is, for example, in the range of about 1:9 to about 9:1, for example, about 2:8 to about 8:2, for example, about 2:8 to about 5:5.

A method of manufacturing the copolymer is disclosed in Korean Patent Publication No. 10-2017-0047661A and Korean Patent Application No. 10-2017-0126353, the contents of which are incorporated herein by reference in their entirety.

Hereinafter, a method of manufacturing a copolymer including the first repeating unit represented by Formula 1 and the second repeating unit represented by Formula 2, according to an embodiment, will be described in detail.

First, polymerization of a monomer represented by Formula 17 below and a monomer represented by Formula 18 below is performed to form a polymerized product.

Formula 17

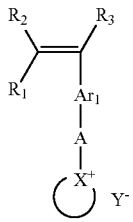

Formula 18

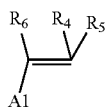

In Formula 17, $Ar_1$, $R_1$ to $R_6$, A1, and

are the same as defined above with reference to Formula 1 and Formula 2.

The monomer of Formula 17 may be a reaction product of a compound represented by Formula 19 below and a compound represented by Formula 20 below.

Formula 19

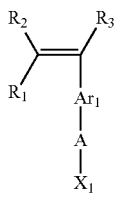

Formula 20

In Formula 19, $X_1$ is a halogen atom, e.g., Cl, Br, F, As, or I, or more specifically, Cl, Br, or I.

In Formula 20,

is the same as defined above with reference to Formula 1.

Alternatively, the copolymer according to an embodiment may also be prepared by first polymerizing the monomer of Formula 19 and the monomer of Formula 18, instead of polymerizing the monomer of Formula 17 and the monomer of Formula 18, and then adding the —

Y— group to a group bonded to A of Formula 19.

Heat treatment conditions during the polymerization reaction may vary according to the molar mixing ratio of the monomers. For example, the polymerization may be performed at a temperature of about 0° C. to about 100° C., or about 10° C. to about 90° C., or about 25° C. to about 80° C.

Subsequently, a reaction between the polymerized product and the compound represented by Formula 20 is performed to form a pre-copolymer. X present at one end of the pre-copolymer is converted into

$X^-$. Subsequently, a compound including $Y^-$ is added to the resultant to obtain the copolymer. The compound represented by Formula 20 may be, for example, N-methylpyrrolidine, N-methylimidazole, imidazole, and the like. The compound including $Y^-$ may be, for example, lithium bis(trifluoromethylsulfonyl)imide, and lithium bis(fluorosulfonyl)imide.

The polymerization may be emulsion polymerization or solution polymerization, without being limited thereto. Polymerization temperature and polymerization time are not particularly limited and may appropriately be adjusted.

In the positive electrode according to an embodiment, the coating layer of the composite positive active material includes a lithium salt. An amount of the lithium salt is in the range of about 0.1 part by weight to about 90 parts by weight, for example, about 0.1 part by weight to about 80 parts by weight, for example, about 0.1 part by weight to about 60 parts by weight, for example, about 0.1 part by weight to about 50 parts by weight, for example, about 0.5 part by weight to about 20 parts by weight, for example, about 1 part by weight to about 10 parts by weight, based on 100 parts by weight of the coating layer. In addition, the lithium salt includes LiSCN, $LiN(CN)_2$, $Li(CF_3SO_2)_3C$, $LiC_4F_9SO_3$, $LiN(SO_2CF_2CF_3)_2$, LiCl, LiF, LiBr, LiI, $LiB(C_2O_4)_2$, $LiBF_4$, $LiBF_3(C_2F_5)$, lithium bis(oxalato) borate (LiBOB), lithium oxalyldifluoroborate (LIODFB), lithium difluoro(oxalato)borate (LiDFOB), lithium bis(trifluoromethanesulfonyl)imide (LiTFSI, $LiN(SO_2CF_3)_2$), lithium bis(fluorosulfonyl)imide (LiFSI, $LiN(SO_2F)_2$), $LiCF_3SO_3$, $LiAsF_6$, $LiSbF_6$, $LiClO_4$, or a combination thereof.

In a composite positive active material according to an embodiment, an amount of the copolymer including a first repeating unit represented by Formula 1 above, and a second repeating unit represented by Formula 2 above is in the range of about 1 part by weight to about 90 parts by weight, for example, about 1 part by weight to about 50 parts by weight, for example, about 1 part by weight to about 30 parts by weight, for example, about 1 part by weight to about 20 parts by weight, for example, about 1 part by weight to about 10 parts by weight, based on 100 parts by weight of the composite positive active material.

The coating layer may have a thickness of about 0.1 nanometer (nm) to about 100 nm, for example, about 0.5 nm to about 50 nm, for example, about 1 nm to about 20 nm, for example, about 1 nm to about 10 nm.

The copolymer may be a heterogeneous polymer.

As used herein, the term "heterogeneous polymer" refers to a polymer in which the arrangement of the first repeating units and the second repeating units in the copolymer is irregularly or non-uniform (e.g., non-homogenously) present.

The copolymer may be a block copolymer, an alternating copolymer, a random copolymer, or the like, for example, a random copolymer.

The random copolymer may include the first repeating units and the second repeating units in a heterogeneous state. In the random copolymer, because the first repeating units and the second repeating units are present in a heterogeneous state and interactions between the first repeating units are decreased as compared a block copolymer, migration of the first repeating units toward a lithium region on the surface of a lithium negative electrode is facilitated, thereby efficiently blocking formation of a lithium dendrite. As a result, a uniform charge delocalization effect is provided over the entire area of the copolymer, and thus formation of a dendrite caused by a local increase in lithium ions may be effectively inhibited on the surface of the lithium metal.

Also, a random copolymer is easier to synthesize and less expensive to manufacture than a block copolymer. In addition, a random copolymer may have similar physical properties to those of a block copolymer over the entire backbone of the polymer.

For example, because the first repeating units represented by Formula 1 and the second repeating units represented by the Formula 2 may be locally present in a block copolymer, when compared with the random copolymer, it may be difficult for the block copolymer to uniformly inhibit the growth of a lithium dendrite on the surface of a lithium negative electrode. Also, in the block copolymer, localization of charges easily occurs in a polymer block formed of the second repeating units (i.e., the repeating units not including an ionic liquid moiety), and as a result, it may be difficult to effectively inhibit the growth of a lithium dendrite caused by local reduction in lithium ions on the surface of lithium metal. Also, in a block copolymer, the first repeating units are relatively difficult to move to the area in which the lithium dendrite is formed due to interactions between the first repeating units, when compared with the random copolymer, and thus chances of blocking formation of a lithium dendrite decreases. Thus, the random copolymer may inhibit formation of a lithium dendrite more effectively than the block copolymer.

In Formula 1, the

group may be an aliphatic ring or an imidazole ring that is a nitrogen-containing aromatic ring. For example, the

group may be an aliphatic ring. When the

group included in the copolymer is an aliphatic ring, the copolymer may be more stable across a wider voltage range than an ionic liquid including an aromatic ring, and thus a wider electrochemical window may be provided. For example, the copolymer may provide a wider reduction potential range to lithium metal. For example, the random copolymer may be electrochemically stable against lithium metal in a negative voltage range. As used herein, the phrase "electrochemically stable" indicates that a current resulting from oxidation or reduction of the copolymer is equal to or less than 0.5 times of a current resulting from oxidation or reduction of lithium.

The aliphatic ring included in the copolymer is not particularly limited, and any known moiety capable of serving as a cation of an ionic liquid may be used.

The copolymer according to an embodiment is a copolymer represented by Formula 6 below or a copolymer represented by Formula 7 below, and the degree of polymerization of the copolymer is about 10 to about 5,000.

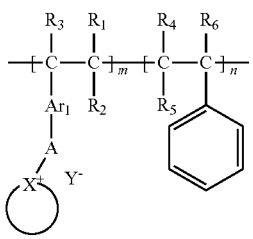

Formula 6

In Formula 6, $Ar_1$ is a substituted or unsubstituted C6-C30 arylene group, $R_1$ to $R_6$ are each independently hydrogen, a substituted or unsubstituted C1-C30 alkyl group, a substituted or unsubstituted C6-C30 aryl group, or a substituted or unsubstituted C3-C30 heteroaryl group, A is a bond, a substituted or unsubstituted C1-C30 alkylene group, or a substituted or unsubstituted C6-C30 arylene group, $Y^-$ includes $BF_4^-$, $PF_6^-$, $AsF_6^-$, $SbF_6^-$, $HSO_4^-$, $CH_3SO_3^-$, $(CF_3SO_2)_2N^-$, $Cl^-$, $Br^-$, $I^-$, $SO_4^{2-}$, $ClO_4^-$, $CF_3SO_3^-$, $CF_3CO_2^-$, $(C_2F_5SO_2)_2N^-$, $(C_2F_5SO_2)(CF_3SO_2)N^-$, $(FSO_2)_2N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5C F_2SO_3^-$, $SF_5CHFCF_2SO_3^-$, $CF_3CF_2(CF_3)_2CO^-$, $(CF_3SO_2)_2 CH^-$, $(SF_5)_3C^-$, $(O(CF_3)_2C_2(CF_3)_2O)_2PO^-$, or a combination thereof, m and n are each independently 0.01 to 0.99, wherein a sum of m and n is 1, and

includes a group represented by Formula 5-1 or Formula 5-2 below.

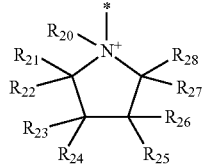

Formula 5-1

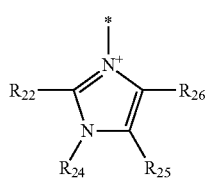

Formula 5-2

In Formula 5-1 and Formula 5-2, $R_{20}$ to $R_{28}$ are each independently hydrogen, a substituted or unsubstituted C1-C30 alkyl group, a substituted or unsubstituted C1-C30 alkoxy group, a substituted or unsubstituted C6-C30 aryl group, a substituted or unsubstituted C6-C30 aryloxy group, a substituted or unsubstituted C3-C30 heteroaryl group, a substituted or unsubstituted C3-C30 heteroaryloxy group, a substituted or unsubstituted C4-C30 cycloalkyl group, or a substituted or unsubstituted C3-C30 heterocycloalkyl group, and * indicates a point of attachment.

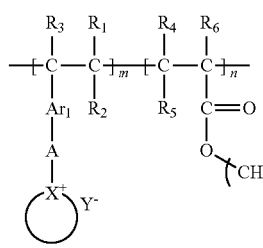

Formula 7

In Formula 7, $Ar_1$ is a substituted or unsubstituted C6-C30 arylene group, $R_1$ to $R_6$ are each independently hydrogen, a substituted or unsubstituted C1-C30 alkyl group, a substituted or unsubstituted C6-C30 aryl group, or a substituted or unsubstituted C3-C30 heteroaryl group, A is bond, a substituted or unsubstituted C1-C30 alkylene group, or a substituted or unsubstituted C6-C30 arylene group, $Y^-$ includes $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^{2-}$, $ClO_4^-$, $CF_3SO_3^-$, $CF_3CO_2^-$, $(C_2F_5SO_2)_2N^-$, $(C_2F_5SO_2)(CF_3SO_2) N^-$, $(FSO_2)_2N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5C$ $F_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof, m and n are each independently 0.01 to 0.99, wherein a sum of m and n is 1, $R_7$ is hydrogen, a substituted or unsubstituted C1-C30 alkyl group, or a substituted or unsubstituted C6-C30 aryl group, a is an integer of 1 to 10, and

is a group represented by Formula 5-1 or Formula 5-2 below.

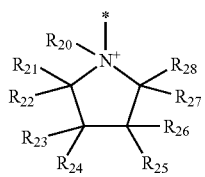

Formula 5-1

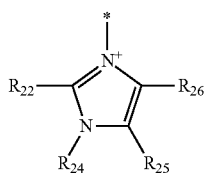

Formula 5-2

In Formula 5-1 and Formula 5-2, $R_{20}$ to $R_{28}$ are each independently hydrogen, a substituted or unsubstituted C1-C30 alkyl group, a substituted or unsubstituted C1-C30 alkoxy group, a substituted or unsubstituted C6-C30 aryl group, a substituted or unsubstituted C6-C30 aryloxy group, a substituted or unsubstituted C3-C30 heteroaryl group, a substituted or unsubstituted C3-C30 heteroaryloxy group, a substituted or unsubstituted C4-C30 cycloalkyl group, or a substituted or unsubstituted C3-C30 heterocycloalkyl group, and * indicates a point of attachment.

A weight average molecular weight of the copolymer is in the range of about 3,000 Daltons (Da) to about 400,000 Da, for example, about 5,000 Da to about 370,000 Da, for example, about 100,000 Da to about 350,000 Da, for example, about 150,000 Da to about 300,000 Da. When the degree of polymerization and weight average molecular weight of the copolymer are within the above ranges, the copolymer may have excellent mechanical strength and may effectively inhibit the growth of a lithium dendrite, thereby further improving performance of the lithium battery. The weight average molecular weight is measured by gel permeation chromatography (GPC) with reference to a polymethylmethacylate (PMMA) standard sample.

For example, the random copolymer may have a polydispersity index (PDI) of about 1 to about 3, for example, about 1 to about 2, for example, about 1.2 to about 2.8. By including the random copolymer having a PDI in the ranges above, performance of the lithium battery may further be improved.

The copolymer may have a glass transition temperature $T_g$ of about 30° C. to about 90° C. For example, the random copolymer having a weight average molecular weight of about 37,000 Da and a glass transition temperature $T_g$ of about 55° C. By including the random copolymer having a glass transition temperature within the range above, performance of the lithium battery may further be improved.

The copolymer may be electrochemically stable with respect to lithium to about −0.4 volts (V.) That is, the random copolymer may not be susceptible to a reduction in current caused by a side reaction of the random copolymer with respect to lithium to about −0.4 V. For example, the random copolymer may provide an electrochemically stable wide voltage window in the range of about −0.4 V to about 6.2 V, for example, about −0.4 V to about 5.5 V, for example, about −0.4 V to about 5.0 V, for example, about −0.4 V to about 4.5 V, with respect to lithium metal.

The positive electrode according to an embodiment may further include a solid electrolyte which is the same as the solid electrolyte of the lithium battery. The positive electrode according to an embodiment may further include a sulfide electrolyte, an oxide electrolyte, or a combination thereof. When the positive electrode includes the same solid electrolyte as that of the lithium battery, interfacial resistance between the positive electrode and the solid electrolyte may further be decreased.

The sulfide (e.g., sulfide-based) solid electrolyte may include a solid electrolyte including sulfur and lithium, and further including phosphorus (P), silicon (Si), boron (B), aluminum (Al), germanium (Ge), zinc (Zn), gallium (Ga), indium (In), tin (Sn), fluorine (F), chlorine (Cl), bromine (Br), iodine (I), or a combination thereof. The sulfide-based solid electrolyte may include lithium sulfide, silicon sulfide, phosphorus sulfide, boron sulfide, or a combination thereof. The solid electrolyte may improve electrochemical stability.

The sulfide-based solid electrolyte may further include, for example, a sulfide in the form of a sulfur lithium super ionic conductor (thio-LISICON) such as $Li_{10}GeP_2S_{12}$. The sulfide-based solid electrolyte may have improved ionic conductivity by further including the sulfide in the form of thio-LISICON.

The sulfide-based solid electrolyte may include, for example, $Li_2S$—$P_2S_5$, $Li_2S$—$P_2S_5$—LiX (where X is a halogen atom such as I or Cl), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are 1 to 10, respectively, and Z is Ge, Zn, or Ga), $Li_2S$—$GeS_2$, $Li_2S$—$SiS_2$—$Li_3PO_4$, $Li_2S$—$SiS_2$—$Li_pMO_q$ (where p and q are 1 to 10, respectively, and M is P, Si, Ge, B, Al, Ga, or In). In this regard, the sulfide-based solid electrolyte may be manufactured by treating a starting material (e.g., $Li_2S$, or $P_2S_5$) by melt quenching or mechanical milling. Heat treatment may further be performed after such treatment. The sulfide-based solid electrolyte may be in an amorphous state, a crystalline state, or a mixed state thereof.

The sulfide-based solid electrolyte may include a solid electrolyte represented by Formula 16 below.

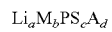

Formula 16

In Formula 16, 0<a≤6, 0≤b≤6, 0≤c≤6, and 0≤d≤6 may be satisfied; M may be Ge, Sn, or Si; and A may be F, Cl, Br, or I.

The oxide (oxide-based) solid electrolyte may include, for example, $Li_{1+x}Ti_{2-x}Al(PO_4)_3$ (LTAP, where 0≤x<4), $Li_{1+x+y}Al_xTi_{2-x}Si_yP_{3-y}O_{12}$ (where 0<x<2 and 0≤y<3), $BaTiO_3$, $Pb(Zr,Ti)O_3$ (PZT), $Pb_{1-x}La_xZr_{1-y}Ti_yO_3$ (PLZT, where 0≤x<1 and 0≤y<1), $Pb(Mg_3Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, lithium phosphate ($Li_3PO_4$), lithium titanium phosphate ($Li_xTi_y(PO_4)_3$, where 0<x<2 and 0<y<3), lithium aluminum titanium phosphate ($Li_xAl_yTi_z(PO_4)_3$, where 0<x<2, 0<y<1, and 0<z<3), $Li_{1+x+y}(Al,Ga)_x(Ti,Ge)_{2-x}Si_yP_{3-y}O_{12}$ (where 0≤x≤1 and 0≤y≤1), lithium lanthanum titanate ($Li_xLa_yTiO_3$, where 0<x<2 and 0<y<3), $Li_2O$, $LiAlO_2$, a $Li_2O$—$Al_2O_3$—$SiO_2$—$P_2O_5$—$TiO_2$—$GeO_2$ ceramic, a garnet ceramic ($Li_{3+x}La_3M_2O_{12}$, where M=Te, Nb, or Zr), or mixture combination thereof.

The oxide-based solid electrolyte may further include an oxide-based inorganic particle and/or another oxide-based solid electrolyte in addition to the above-described oxide-based solid electrolyte.

Because the sulfide-based solid electrolyte and the oxide-based solid electrolyte have excellent ionic conductivity, the ionic conductivity of a positive electrode including the same may further be improved.

The positive electrode may include a conductive agent. The conductive agent may include a carbon nanofiber, graphite, carbon black, graphene, or a combination thereof.

The positive electrode may further include a binder, and may be any binder suitable for use in a lithium battery.

The positive electrode may further include the above-described solid electrolyte.

In the positive electrode according to an embodiment, an amount of the composite positive active material is in the range of about 55 parts by weight to about 95 parts by weight, or about 60 parts by weight to about 90 parts by weight, or about 65 parts by weight to about 80 parts by weight, based on 100 parts by weight of the positive electrode, and an amount of the binder is in the range of about 2.5 parts by weight to about 45 parts by weight, or about 5 parts by weight to about 40 parts by weight, or about 10 parts by weight to about 30 parts by weight, based on 100 parts by weight the positive electrode. In addition, an amount of the solid electrolyte is in the range of about 2.5 parts by weight to about 45 parts by weight, or about 5 parts by weight to about 40 parts by weight, or about 10 parts by weight to about 30 parts by weight, based on 100 parts by weight of the positive electrode, and an amount of the conductive agent is in the range of about 1 part by weight to about 10 parts by weight, or about 2 parts by weight to about 8 parts by weight, or about 2 parts by weight to about 5 parts by weight, based on 100 parts by weight of the positive electrode. Throughout the specification, the "weight of the positive electrode" refers to a sum of the weight of all of the materials in the positive electrode, e.g., the sum of the weights of the composite positive active material, the binder, and the conductive agent.

For example, the positive active material 11 (e.g., the core) of the composite positive active material 10 may include a lithium nickel manganese oxide, a lithium cobalt oxide, a lithium nickel cobalt manganese oxide, a lithium nickel cobalt aluminum oxide, an olivine-based oxide such as a lithium phosphate iron oxide, an overlithiated layered oxide (OLO), or a combination thereof.

The positive active material includes at least one of compounds represented by Formulae 17 to 25 below.

$$Li_aNi_bM5_cM6_dM7_eO_{2-\alpha}X_\alpha \qquad \text{Formula 17}$$

In Formula 17, $0.9 \leq a \leq 1.1$, $0.7 < b < 1.0$, $0 < c < 0.3$, $0 < d < 0.3$, $0 \leq e < 0.1$, $b+c+d+e=1$, and $0 \leq \alpha < 2$, and M5, M6, and M7 are different and are each independently cobalt (Co), manganese (Mn), zirconium (Zr), aluminum (Al), rhenium (Re), vanadium (V), chromium (Cr), iron (Fe), boron (B), ruthenium (Ru), titanium (Ti), niobium (Nb), molybdenum (Mo), magnesium (Mg), or platinum (Pt), and X is O, F, S, or P.

$$Li_aNi_xCO_yMn_zM_cO_{2-e}A_e \qquad \text{Formula 18}$$

In Formula 18, $1.0 \leq a \leq 1.4$, $0 < x < 1$, $0 \leq y < 1$, $0 < z < 1$, $0 \leq c < 1$, $0 < x+y+z+c \leq 1$, $0 \leq e < 1$, M includes at least one of vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), or boron (B), and A is an anion of F, S, Cl, Br, or a combination thereof.

$$Li[Co_{1-x}M_x]O_{2-b}A_b \qquad \text{Formula 19}$$

In Formula 19, $0 \leq b \leq 0.1$, $0 \leq x \leq 0.1$, and M includes at least one of Mg, Al, Ni, Mn, Zn, Fe, Cr, Ga, Mo, or W, and A is an anion of F, S, Cl, Br, or a combination thereof.

$$Li_{1+a}[Ni_{1-x}M_x]O_{2-b}A_b \qquad \text{Formula 20}$$

In Formula 20, $0 \leq a \leq 0.2$, $0 \leq b \leq 0.1$, $0.01 \leq x \leq 0.5$, M includes at least one of Mg, Al, Co, Mn, Zn, Fe, Cr, Ga, Mo, or W, and A is an anion of F, S, Cl, Br, or a combination thereof.

$$Li_{1+a}[Mn_{2-x}M_x]O_{4-b}A_b \qquad \text{Formula 21}$$

In Formula 21, $0 \leq a \leq 0.15$, $0 \leq b \leq 0.1$, $0 \leq x \leq 0.1$, and M includes at least one of Co, Ni, Cr, Mg, Al, Zn, Mo, or W, and A is an anion of F, S, Cl, Br, or a combination thereof.

$$LiM_xFe_{1-x}PO_4 \qquad \text{Formula 22}$$

In Formula 22, M includes at least one of Co, Ni, or Mn, and $0 \leq x \leq 1$.

$$Li_{1+a}[Ni_{0.5}Mn_{1.5-x}M_x]O_{4-b}A_b \qquad \text{Formula 23}$$

In Formula 23, $0 \leq a \leq 0.15$, $0 \leq b \leq 0.1$, $0 \leq x \leq 0.1$, M includes at least one of Co, Ni, Cr, Mg, Al, Zn, Mo, or W, and A is an anion of F, S, Cl, Br, or a combination thereof.

$$Li_xM8_yM9_zPO_{4-\alpha}X_\alpha \qquad \text{Formula 24}$$

In Formula 24, $0.90 \leq x \leq 1.1$, $0 \leq y \leq 0.9$, $0 \leq z \leq 0.5$, $1-y-z>0$, $0 \leq \alpha \leq 2$, M8 includes at least one of Ti, V, Cr, Mn, Co, Ni, Cu, Al, Mg, Zr, or B, M9 includes at least of Mg, Ca, Sr, Ba, Ti, Zr, Nb, Mo, W, Zn, Al, Si, Ni, Mn, Cr, Fe, Mg, Sr, V, or a rare earth element, and X is O, F, S, or P.

$$aLi_2MnO_3 \cdot (1-a)LiMO_{2-\alpha}X_\alpha \qquad \text{Formula 25}$$

In Formula 25, $0<a<1$, $0 \leq \alpha <2$, and M includes at least two of nickel (Ni), cobalt (Co), manganese (Mn), zirconium (Zr), aluminum (Al), rhenium (Re), vanadium (V), chromium (Cr), iron (Fe), boron (B), ruthenium (Ru), titanium (Ti), niobium (Nb), molybdenum (Mo), magnesium (Mg), or platinum (Pt).

A lithium battery according to another embodiment includes a positive electrode, a negative electrode, and at least one solid electrolyte between the positive electrode and the negative electrode and including a sulfide-based solid electrolyte, an oxide-based solid electrolyte, or a combination thereof.

The solid electrolyte may be a solid at a temperature of 50° C. or less, for example, 30° C. or less, for example, 25° C. or less. The solid electrolyte may be a solid at room temperature due to the inclusion of a copolymer. The solid electrolyte may be a solvent-free electrolyte. For example, the solid electrolyte may be a solid polymer electrolyte comprising, consisting essentially of, or consisting of, a copolymer and a lithium salt, without a solvent. When the electrolyte does not include a solvent, a side reaction caused by the solvent, and leakage of the solvent from the battery, may be prevented. For example, the solid electrolyte may be a sulfide-based solid electrolyte, an oxide-based solid electrolyte, or a combination thereof.

The sulfide-based solid electrolyte and/or the oxide-based solid electrolyte may be the same as, or different from, those used in the positive electrode.

The negative electrode may include lithium metal, a lithium metal alloy, or a material capable of incorporation and deincorporation of lithium, without being limited thereto. Any material including lithium or which is capable of incorporation and deincorporation of lithium and which is suitable for use in a negative electrode may also be used. Because the negative electrode determines the capacity of a lithium battery, the negative electrode may be, for example, lithium metal. The lithium-based alloy may be, for example, an alloy of lithium with aluminum, tin, magnesium, indium, calcium, titanium, vanadium, or a combination thereof.

For example, the negative electrode may include lithium metal or an alloy of lithium metal; or the negative electrode may include a negative active material including a carbon-based material, silicon, a silicon oxide, a silicon-based alloy, a silicon-carbon composite, tin, a tin-based alloy, a tin-carbon composite, a metal alloyable with lithium oxide, an alloy or oxide thereof, or a combination thereof. As used herein, the term "metal" refers to metallic or metalloid elements as defined in the Periodic Table of Elements selected from Groups 1 to 17, including the lanthanide elements and the actinide elements.

The positive electrode may have a thickness of about 0.1 micrometer (μm) to about 100 μm, or about 0.5 μm to about 75 μm, or about 1 μm to about 50 μm. The solid electrolyte may have a thickness of about 0.001 μm to about 1000 μm, for example, about 0.1 μm to about 100 μm, for example, about 0.5 μm to about 70 μm, for example, about 1 μm to about 50 μm, for example, about 1 μm to about 20 μm.

Hereinafter, a method of manufacturing a positive electrode according to an embodiment will be described in more detail.

According to an embodiment, a positive electrode is prepared by mixing a composite positive active material, a conductive agent, and a binder in a solid phase state.

As the binder, the same material used as the solid electrolyte as described above, may also be used as the binder for the positive electrode. An additional binder suitable for use in a lithium battery may also be used together. The additional binder may include a thermoplastic resin or a thermosetting resin. For example, polyethylene, polypropylene, polytetrafluoroethylene (PTFE), polyvinylidene fluoride (PVDF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, an ethylene-acrylic acid copolymer, or a combination thereof.

According to another embodiment, a positive electrode may be manufactured by preparing a positive active material composition by mixing a composite positive active material, a conductive agent, a binder, and a solvent, coating the positive active material composition on a positive electrode current collector, and drying the coated composition. Alternatively, the positive active material composition may be cast on a separate support, and a film separated from the support may be laminated on a metallic current collector to manufacture a positive electrode plate The coating may be performed by a method such as solvent casting, without being limited thereto.

Figure 10:
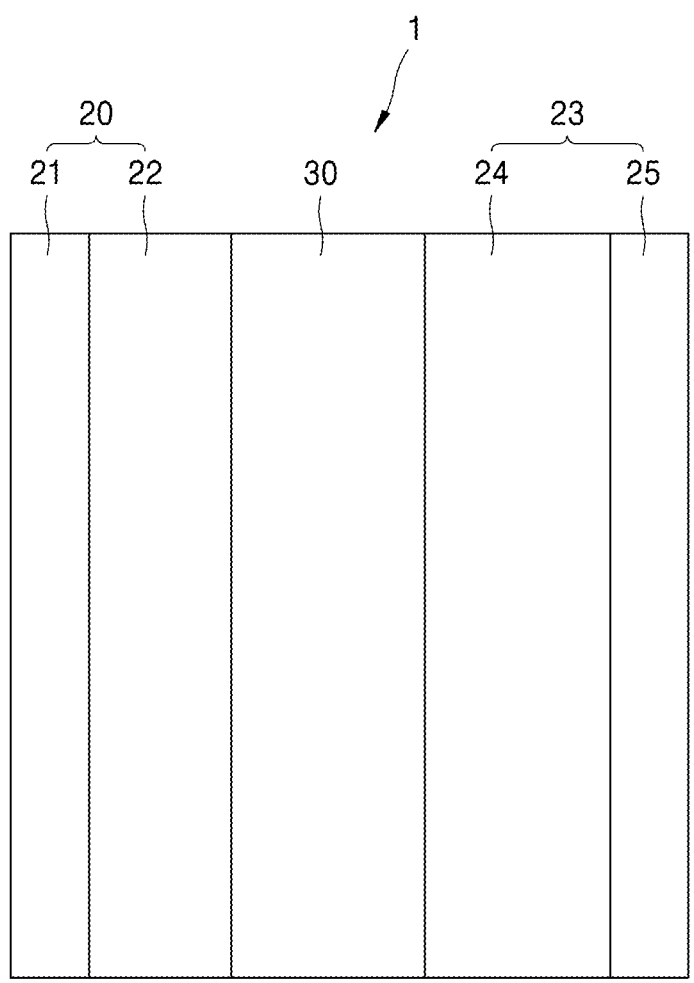
FIG. 10 is a schematic diagram illustrating a structure of a solid battery, according to an embodiment.

Referring to FIG. 10, a solid battery according to an embodiment will be described. A solid battery 1 includes a positive electrode 20 according to an embodiment, a negative electrode 23, and a solid electrolyte 30 interposed between the positive electrode 20 and the negative electrode 23. The solid electrolyte 30 is interposed between the positive electrode 20 and the negative electrode 23 and pressed to manufacture the solid secondary battery 1. The pressing process may be omitted.

The pressing process may be performed by using a roll press, a flat press, or a press using a hydrostatic pressure. However, the embodiment is not limited thereto, and any pressing process available in the art may also be used. The pressing process may be performed at a temperature in the range of 20° C. to about 90° C., for example, about 22° C. to about 90° C., or about 25° C. to about 90° C. Alternatively, the pressing process is performed at a high temperature of 100° C. or greater. As a result of the pressing process, the solid electrolyte powder is sintered to form a solid electrolyte layer. The solid battery may be a solid secondary battery.

The configuration and manufacturing method of the solid secondary battery 1 described above are examples of the embodiment, and constituent members, manufacturing procedures, and the like may be modified appropriately.

Substituents in the above-described chemical formulas are defined as follows.

The alkyl group refers to a completely saturated, branched or unbranched (or straight-chain or linear) monovalent hydrocarbon. Examples of the alkyl group may include, but are not limited to, a methyl group, an ethyl group, an n-propyl group, an isopropyl group, an n-butyl group, an isobutyl group, a sec-butyl group, an n-pentyl group, an isopentyl group, a neopentyl group, an iso-amyl group, an n-hexyl group, a 3-methylhexyl group, a 2,2-dimethylpentyl group, a 2,3-dimethylpentyl group, and an n-heptyl group. At least one hydrogen atom of the alkyl group may be substituted with a halogen atom, a C1-C30 alkyl group substituted with a halogen atom (e.g.: $CF_3$, $CH_3CF_2$, $CH_2F$, and $CCl_3$), a C1-C30 alkoxy group, a C2-C30 alkoxyalkyl group, a hydroxyl group, a nitro group ($-NO_2$), a cyano group ($-CN$), an amino group ($-NH_2$), an alkylamino group (RNH— wherein R is a C1-C10 alkyl group), an amidino group ($-C(=NH)NH_2$), a hydrazine group ($-NHNH_2$), a hydrazone group ($=N-NH_2$), a carboxyl group or carboxylic acid group or a salt thereof ($-C(=O)OX$ wherein X is a hydrogen or a counterion), a sulfonyl group ($-S(=O)_2-$), a sulfamoyl group ($NH_2-SO_2-$), a sulfonic acid group or a salt thereof (($-SO_3X_2$ wherein X is a hydrogen or a counterion), a phosphoric acid group or a salt thereof ($-PO_3X_2$ wherein X is a hydrogen or a counterion), a C1-C30 alkyl group, a C2-C30 alkenyl group, a C2-C30 alkynyl group, a C1-C30 heteroalkyl group, a C6-C30 aryl group, a C6-C30 arylalkyl group, a C6-C30 heteroaryl group, a C7-C30 heteroarylalkyl group, a C6-C30 heteroaryloxy group, a C6-C30 heteroaryloxylalkyl group, or a C6-C30 heteroarylalkyl group.

The alkenyl group refers to an aliphatic hydrocarbon group including at least one carbon-carbon double bond. An alkynyl group refers to an aliphatic hydrocarbon group including at least one carbon-carbon triple bond. At least one hydrogen atom in the alkenyl or alkynyl group may be substituted with one of the substituents as described above in connection with the alkyl group. The indicated total number of carbon atoms for a group does not include any substituents if present.

The cycloalkyl group refers to an aliphatic hydrocarbon group including at least one ring and optionally an alkyl group. The alkyl group in the cycloalkyl group may be the same defined above.

A heterocycloalkyl group refers to a cycloalkyl group including at least one hetero atom selected from N, O, P, S, or a combination thereof in a ring thereof. In this regard, the cycloalkyl group in the heterocycloalkyl group may be the same as described above. At least one hydrogen atom in the cycloalkyl or heterocycloalkyl group may be substituted with one of the substituents as described above in connection with the alkyl group.

The halogen atom includes fluorine, bromine, chlorine, and iodine.

The alkoxy group is represented by "alkyl-O—", wherein the alkyl group may be the same as defined above. Examples of the alkoxy group may include, but are not limited to, a methoxy group, an ethoxy group, a propoxy group, a 2-propoxy group, a butoxy group, and a t-butoxy group, a pentyloxy group, a hexyloxy group, a cyclopropoxy group, and a cyclohexyloxy group. At least one hydrogen atom of the alkoxy group may be substituted with one of the substituents as described above with reference to the alkyl group.

The cycloalkyloxy group is represented by "cycloalkyl-O—", wherein the cycloalkyl group is as described above. The heterocycloalkyloxy group may be represented by heterocycloalkyl-O—, wherein the heterocycloalkyl group is as described above.

The aryl group refers to an aromatic hydrocarbon group having at least one ring. The aryl group includes a group in which an aromatic ring is fused to at least one cycloalkyl ring. Non-limiting examples of the aryl may include, but are not limited to, a phenyl group, a naphthyl group, and a tetrahydronaphthyl group. At least one hydrogen atom in the aryl group may be substituted with one of the same substituents as described above with reference to the alkyl group.

The arylalkyl group is represented by alkyl-aryl-group, wherein the alkyl group and the aryl group are the same as described above.

The aryloxy group is represented by aryl-O—, wherein the aryl group is the same as described above.

The arylthio group is represented by aryl-S—, wherein the aryl group is the same as described above.

The heteroaryl group refers to a monocyclic or bicyclic aryl group including at least one of N, O, P, or S, wherein the rest of the cyclic atoms are all carbon atoms. The heteroaryl group may include, for example, 1 to 5 hetero atoms and may be a 5- to 10-membered ring. In the heteroaryl group, S or N may be present in various oxidized forms.

Non-limiting examples of a monocyclic heteroaryl group may be a thienyl group, a furyl group, a pyrrolyl group, an imidazolyl group, a pyrazolyl group, a thiazolyl group, an isothiazolyl group, a 1,2,3-oxadiazolyl group, a 1,2,4-oxadiazolyl group, a 1,2,5-oxadiazolyl group, a 1,3,4-oxadiazolyl group, a 1,2,3-thiadiazolyl group, a 1,2,4-thiadiazolyl group, a 1,2,5-thiadiazolyl group, a 1,3,4-thiadiazolyl group, an isothiazol-3-yl group, an isothiazol-4-yl group, an isothiazol-5-yl group, an oxazol-2-yl group, an oxazol-4-yl group, an oxazol-5-yl group, an isooxazol-3-yl group, an isooxazol-4-yl group, an isooxazol-5-yl group, a 1,2,4-triazol-3-yl group, a 1,2,4-triazol-5-yl group, a 1,2,3-triazol-4-yl group, a 1,2,3-triazol-5-yl group, a tetrazolyl group, a pyrid-2-yl group, a pyrid-3-yl group, a 2-pyrazine-2-yl group, a pyrazine-4-yl group, a pyrazine-5-yl group, a 2-pyrimidine-2-yl group, a 4-pyrimidine-2-yl group, or a 5-pyrimidine-2-yl group.

The heteroaryl group refers to a heteroaromatic ring fused to at least one of an aryl group, a cycloaliphatic group, or a heterocyclic group.

Examples of the bicyclic heteroaryl group include an indolyl group, an isoindolyl group, an indazolyl group, an indolizinyl group, a purinyl group, a quinolizinyl group, a quinolinyl group, or an isoquinolinyl group. At least one hydrogen atom in the heteroaryl group may be substituted with the same substituents as described above with reference to the alkyl group.

The heteroarylalkyl group is represented by alkyl-heteroaryl-, wherein the aryl group is the same as described above. The heteroaryloxy group is represented by heteroaryl-O—, wherein the heteroaryl group is the same as described above. In addition, the heteroarylthio group is represented by heteroaryl-S—, wherein the heteroaryl group is the same as described above.

The terms alkylene, arylene, heteroarylene, cycloalkylene, and heterocycloalkylene refer to, respectively, alkyl, aryl, heteroaryl, cycloalkyl, and heterocycloalkyl, in which one hydrogen atom is removed.

It is to be understood that in some chemical formulae herein, a point of attachment may be indicated by a bond "-" with or without an asterisk (i.e., "-*").

A C rate is a discharge rate of a cell, and is obtained by dividing a total capacity of the cell by a total discharge period of time, e.g., a C rate for a battery having a discharge capacity of 1.6 ampere-hours would be 1.6 amperes.

Hereinafter, one or more embodiments of the present disclosure will be described in detail with reference to the following examples and comparative examples. These examples and comparative examples are not intended to limit the purpose and scope of the one or more embodiments of the present disclosure.

EXAMPLES

Preparation Example 1: Synthesis of Copolymer Represented by Formula 98

10 g of 1-chloromethyl-4-vinylbenzene (manufactured by Oakwood chemicals) was added to a reactor, and 6.13 g of N-methylpyrrolidine (97%, manufactured by Sigma-Aldrich) dissolved in 100 ml of dichloroethane, was added thereto. The mixture was stirred at 70° C. for 9 hours to obtain an intermediate product in which a nitrogen atom of N-methylpyrrolidium is bonded to a methyl group of 1-chloromethyl-4-vinylbenzene.

The intermediate product and an aqueous solution of lithium bis(trifluoromethylsulfonyl)imide (LiTFSI, manufactured by PANAX) were mixed in a molar ratio of 1:1.2 and stirred at room temperature for 6 hours to synthesize a vinylbenzyl-4-methyl-pyrrolidium $^+$TFSI$^-$(mVBMPYR$^+$TFSI$^-$) monomer in which a Cl$^-$anion is substituted with a TFSI$^-$anion.

Subsequently, 20 g of styrene and 10.74 g of the synthesized vinylbenzyl-4-methyl-pyrrolidium $^+$TFSI$^-$ (mVBMPYR$^+$TFSI$^-$) were added to a reactor (from which impurities such as oxygen and moisture were removed) in a molar ratio of 8:2, and then 0.75 g of azobisisobutyronitrile (AIBN) as an initiator was added thereto. The mixture was stirred at 60° C. for 15 hours to perform polymerization. After completion of the polymerization reaction, the solvent was removed under a reduced pressure and the resultant was precipitated with methanol to obtain a random copolymer having the structure of Formula 8 below, as a polymerization product.

Formula 8

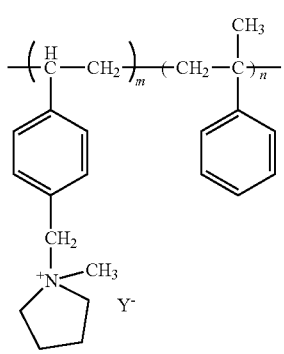

In Formula 8, m is 0.2, n is 0.8, and Y⁻ is TFSI⁻.

A weight average molecular weight of the obtained random copolymer was measured by gel permeation chromatography (GPC) with respect to a polymethylmethacylate (PMMA) standard sample. The obtained random copolymer had a weight average molecular weight Mw of 375,000 Da and a polydispersity index (PDI) of 1.55.

Preparation Example 2: Synthesis of Copolymer Represented by Formula 8

The copolymer represented by Formula 8 was prepared in the same manner as described in Preparation Example 1, except that a molar ratio of styrene to the vinylbenzyl-4-methyl-pyrrolidium ⁺TFSI⁻(mVBMPYR⁺TFSI⁻) monomer was 7:3.

Formula 8

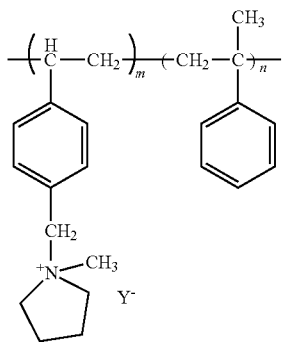

In Formula 8, m is 0.3, n is 0.7, and Y⁺ is TFSI⁻.

Preparation Example 3

0.4 g of the random copolymer prepared according to Preparation Example 1 and 0.4 g of a lithium salt of LiTFSI were mixed in 20 ml of acetone, and the mixture was stirred for 1 hour to obtain a positive electrode composition. The positive electrode composition was coated and dried on a support substrate to obtain a copolymer freestanding film having a thickness of about 100 μm thickness.

Preparation Example 4: Synthesis of Random Copolymer Represented by Formula 12

10 g of 1-chloromethyl-4-vinylbenzene (manufactured by Oakwood chemicals) and poly(ethylene glycol) methyl ether methacrylate A were added to a reactor, and then 0.075 g of azobisisobutyronitrile (AIBN) as a polymerization initiator was added thereto. The mixture was stirred at 60° C. for 15 hours to facilitate polymerization. A molar ratio of 1-chloromethyl-4-vinylbenzene to poly(ethylene glycol) methyl ether methacrylate was 4:1. After completion of the polymerization, the solvent was removed under a reduced pressure and the resultant was precipitated with n-hexane to obtain a random copolymer B. The reaction is shown below in Reaction scheme 1.

Reaction Scheme 1

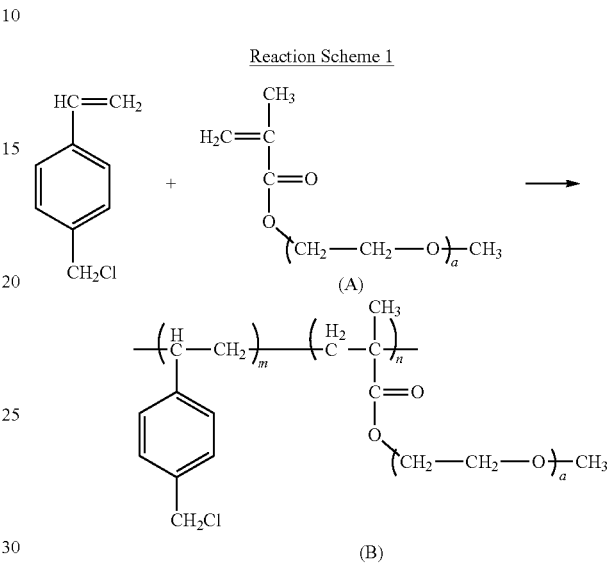

6.13 g of N-methylpyrrolidine (97%, manufactured by Sigma-Aldrich) dissolved in 100 ml of dichloroethane was added to the random copolymer B, and the mixture was stirred at about 70° C. for 9 hours to prepare a random copolymer having the structure of Formula C.

Formula C

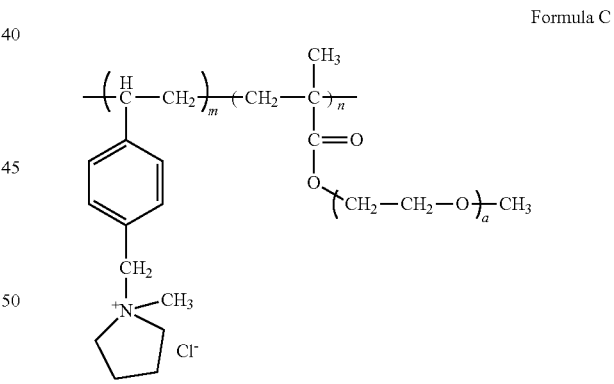

In the above formula C, m is 0.8, n is 0.2, and a is 10.

Lithium bis(trifluoromethylsulfonyl)imide (LiTFSI, manufactured by PANAX) and acetone were added to the random copolymer having the structure of Formula C in a molar ratio of 1:1.2 to prepare a random copolymer composition. An amount of acetone was adjusted such that an amount of the random copolymer C was about 10 wt %, based on a total weight of the random copolymer composition. The reaction mixture was stirred at room temperature (25° C.) for 6 hours to synthesize a random copolymer represented by Formula 12, in which a Cl⁻ anion of the random copolymer of Formula C is substituted with a TFSI⁻ anion.

Formula 12

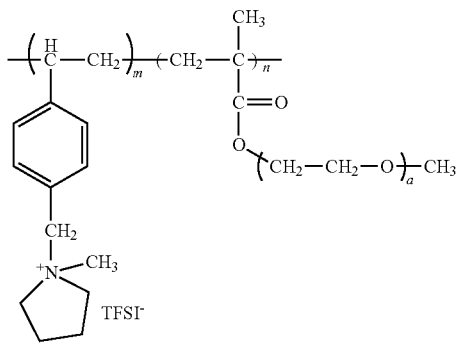

In Formula 12, m and n are mole fractions, and a sum of m and n is 1. In this case, m is 0.8, n is 0.2, a is 10, and the degree of polymerization is adjusted such that an average molecular weight of the random copolymer of Formula 12 is about 300,000 Da.

Example 1: Manufacture of Lithium Battery (Solid Battery)

0.4 g of the random copolymer prepared according to Preparation Example 1 and 0.4 g of a lithium salt of LiTFSI were added to acetone and mixed, and 39.2 g of $LiNi_{0.8}Co_{0.2}Mn_{0.2}O_2$ was added thereto and mixed for 1 hour.

Subsequently, acetone was completely removed from the mixture by evaporation at 60° C. to prepare a composite positive active material. The composite positive active material included $LiNi_{0.8}Co_{0.1}Mn_{0.1}O_2$ as a core material, and a coating layer including the random copolymer prepared according to Preparation Example 1 and the lithium salt of LiTFSI, was formed on the surface of $LiNi_{0.8}Co_{0.2}Mn_{0.2}O_2$. An amount of the lithium salt of LiTFSI in the coating layer was 1 part by weight based on 100 parts by weight of a total weight of the coating layer (i.e., a sum of the weight of the random copolymer according to Preparation Example 1 and the weight of the lithium salt of LiTFSI), and an amount of the random copolymer according to Preparation Example 1 was 1 part by weight based on 100 parts by weight of the total weight of the composite positive active material (i.e., a sum of the weight of $LiNi_{0.8}Co_{0.1}Mn_{0.1}O_2$, the weight of the random copolymer, and the weight of the lithium salt.

The composite positive active material, $Li_6PS_5Cl$, and a carbon nanofiber were mixed in a weight ratio of 60:35:5 in a solid phase to obtain a positive electrode.

A stack structure of a lithium (Li) film having a thickness of about 20 μm and an indium (In) film having a thickness of 50 μm, was used as a negative electrode. A $Li_6PS_5Cl$ film having a thickness of 100 μm, as a sulfide-based solid electrolyte, was stacked on the indium film of the negative electrode, and a positive electrode was stacked thereon. The entire structure was pressed with a force of about 4 ton/cm² to prepare a lithium battery (solid battery).

Example 2: Preparation of Lithium Battery (Solid Battery)

A lithium battery was prepared in the same manner as in Example 1, except that the copolymer prepared according to Preparation Example 2 was used instead of the copolymer prepared according to Preparation Example 1.

Examples 3 and 4: Preparation of Lithium Battery (Solid Battery)

Lithium batteries were prepared in the same manner as in Example 1, except that the amount of the random copolymer according to Preparation Example 1 was adjusted to 5 parts by weight and 10 parts by weight, respectively, based on 100 parts by weight of the total weight of the composite positive active material (i.e., the sum of the weight of $LiNi_{0.8}Co_{0.1}Mn_{0.1}O_2$, the weight of the random copolymer, and the weight of the lithium salt).

Example 5: Preparation of Lithium Battery (Solid Battery)

A lithium battery was prepared in the same manner as in Example 1, except that the copolymer prepared according to Preparation Example 4 was used instead of the copolymer prepared according to Preparation Example 1 in the preparation of the composite positive active material.

Comparative Example 1: Preparation of Lithium Battery (Solid Battery)

A lithium battery was prepared in the same manner as in Example 1, except that $LiNi_{0.8}Co_{0.1}Mn_{0.1}O_2$ was used as a positive active material instead of the composite positive active material, and a composite layer according to the following procedure was used instead of the $Li_6PS_5Cl$ film as a sulfide-based solid electrolyte.

The composite layer was obtained by coating a composite layer-forming composition, which included 0.4 g of polyethylene oxide, 0.03 g of alumina, 0.2 g of LiTFSI, and 4 ml of acetonitrile (as a solvent), on a lithium foil having a thickness of 20 μm by using a doctor blade, and drying the coated composition in a drying chamber at room temperature (about 25° C.) for 2 days and then in a vacuum at 60° C. overnight.

Evaluation Example 1: Scanning Electron Microscope (SEM)

The composite positive active material prepared according to Example 1 was analyzed using a scanning electron microscope (SEM). The SEM used was a JSM-7500F having an acceleration voltage of 20 kilovolts (kV) and an SEM analysis result is shown in FIG. 1B.

Figure 1B:
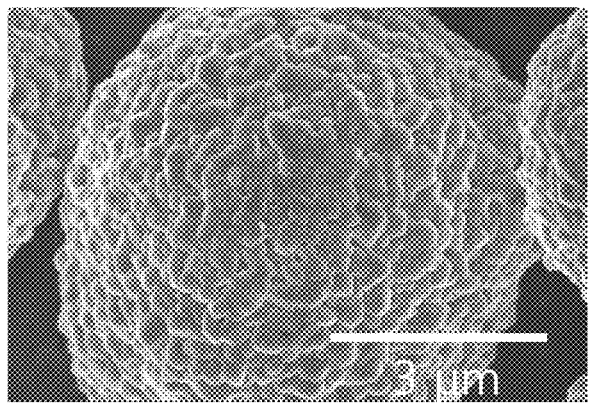
FIG. 1B is a scanning electron microscope (SEM) image of a composite positive active material prepared according to Example 1.

It was confirmed that the coating layer including the copolymer is uniformly formed on the surface of the positive active material (NCM), without agglomerating, in the composite positive active material prepared according to Example 1 as shown in FIG. 1B.

Evaluation Example 2: Linear Sweep Voltammetry (LSV)

Figure 2:
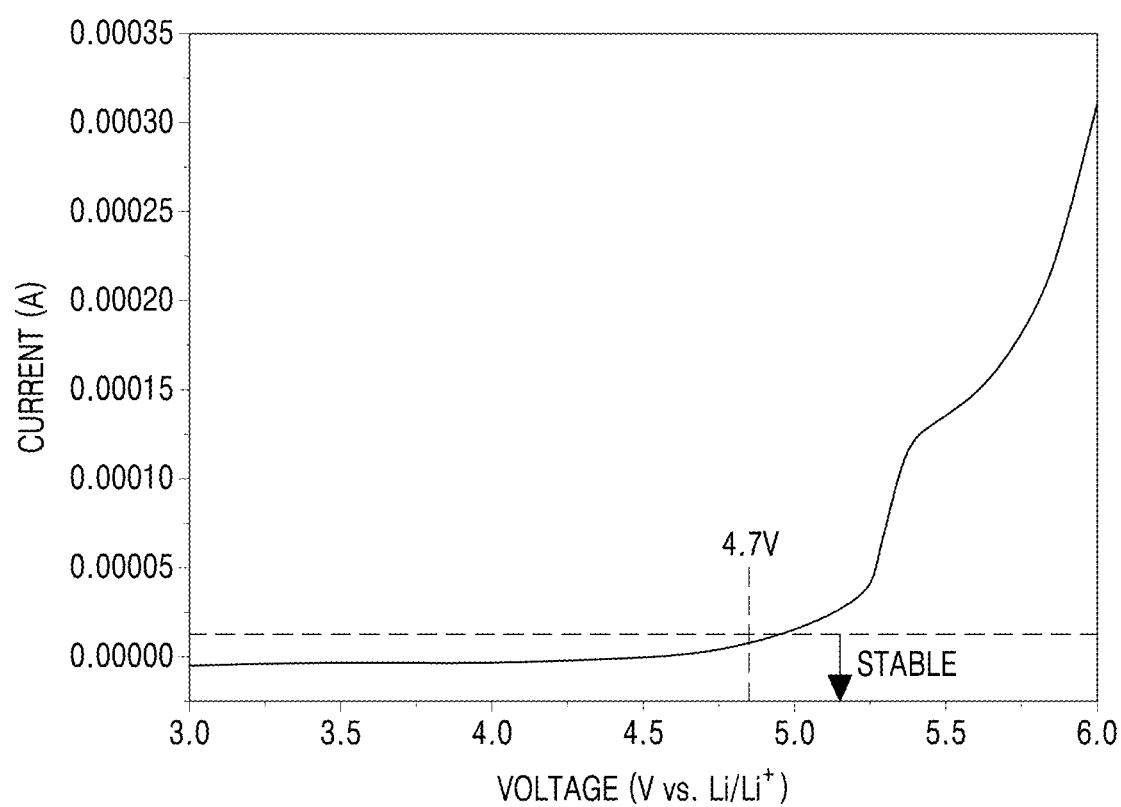
FIG. 2 is a graph of current (ampere, A) versus voltage (volts versus lithium, V vs Li/Li$^+$), illustrating the linear sweep voltammetry (LSV) results of a copolymer film obtained according to Preparation Example 3.

The copolymer freestanding film prepared according to Preparation Example 3 was interposed between Li/stainless steel (SUS) electrodes to prepare a cell. Linear sweep voltammetry (LSV) of the cell was measured at 60° C. to evaluate electrochemical stability. LSV results are shown in FIG. 2. A scanning rate was about 10 millivolts per second (mV/s), and a scanning voltage was in the range of 3 V to 6 V (vs. Li/Li+).

As shown in FIG. 2, because oxidation reactions did not occur up to 4.7 V it was confirmed that the cell was electrochemically stable.

Evaluation Example 3: Current Characteristics at High Voltage

The copolymer freestanding film prepared according to Preparation Example 3 was interposed between Li/stainless steel (SUS) electrodes to prepare a cell. Electrochemical stability of the cell was tested in a high voltage environment of 4.4 V, and the test results are shown in FIG. 3.

Figure 3:
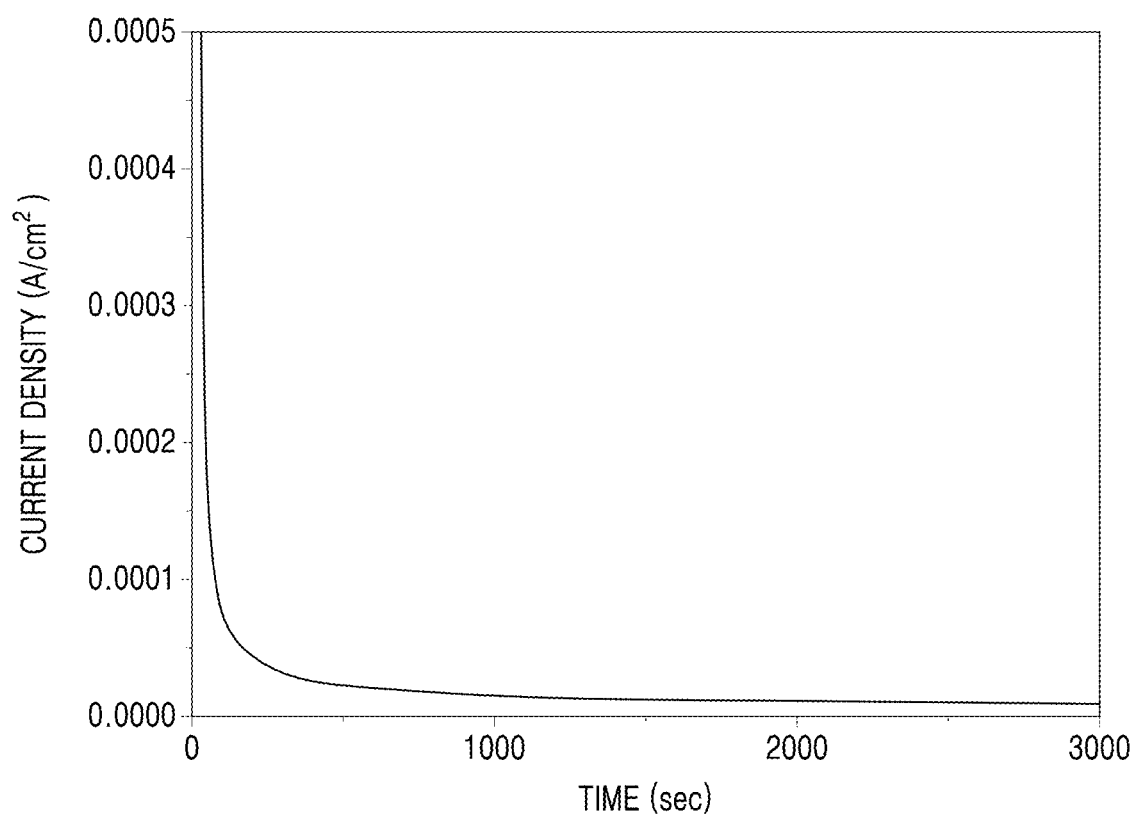
FIG. 3 is a graph of current density (amperes per square centimeter, A/cm$^2$) versus time (seconds, sec), illustrating results of electrochemical stability evaluation of the copolymer film obtained according to Preparation Example 3 in a high-voltage environment.

As shown in FIG. 3, the cell exhibited a very low current of 5 microampere (μA) or less at 4.4 V. Thus, it was confirmed that the cell was very stable at a high voltage. As described above, a side reaction may be inhibited at a high voltage by using the copolymer including a repeating unit containing a polymeric ionic liquid (PIL) as the material forming the coating layer of the composite positive active material.

Evaluation Example 4: Lithium Ion Conductivity

The copolymer freestanding film prepared according to Preparation Example 3 was interposed between Li/Li films and a lithium ion conductivity thereof was measured at a temperature of 25° C. to 60° C. The results are shown in FIG. 4.

Figure 4:
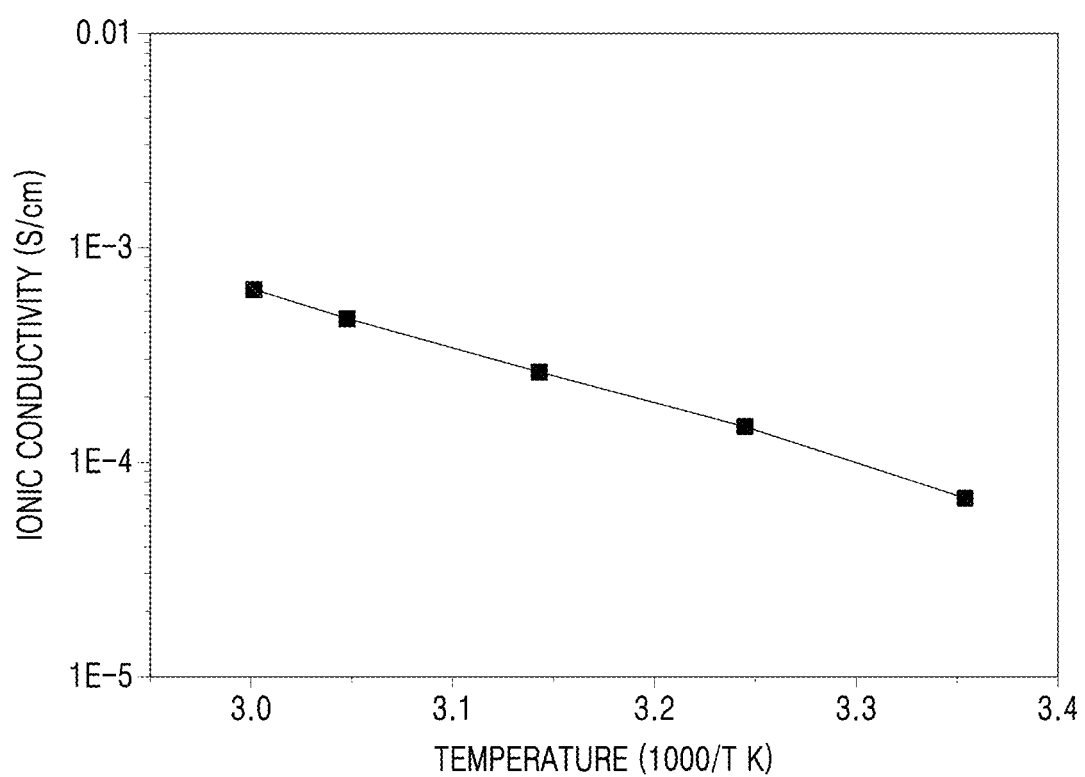
FIG. 4 is a graph of ionic conductivity (Siemens per centimeter, S/cm) versus reciprocal temperature (1000/T K$^{-1}$), illustrating lithium ion conductivity results of the copolymer film obtained according to Preparation Example 3.

Referring to FIG. 4, the copolymer film had excellent ionic conductivity of $8 \times 10^{-5}$ S/cm at room temperature (25° C.). Based on the result, it was confirmed that the copolymer film had electrochemical properties capable of maintaining sufficient lithium ion conductivity between the positive electrode and the electrolyte at a temperature of room temperature (25° C.) to 60° C.

Evaluation Example 5: Mechanical Properties

Mechanical properties of the copolymer freestanding film prepared according to Preparation Example 3 were measured by dynamic mechanical analysis (DMA). The results are shown in FIG. 5.

Figure 5:
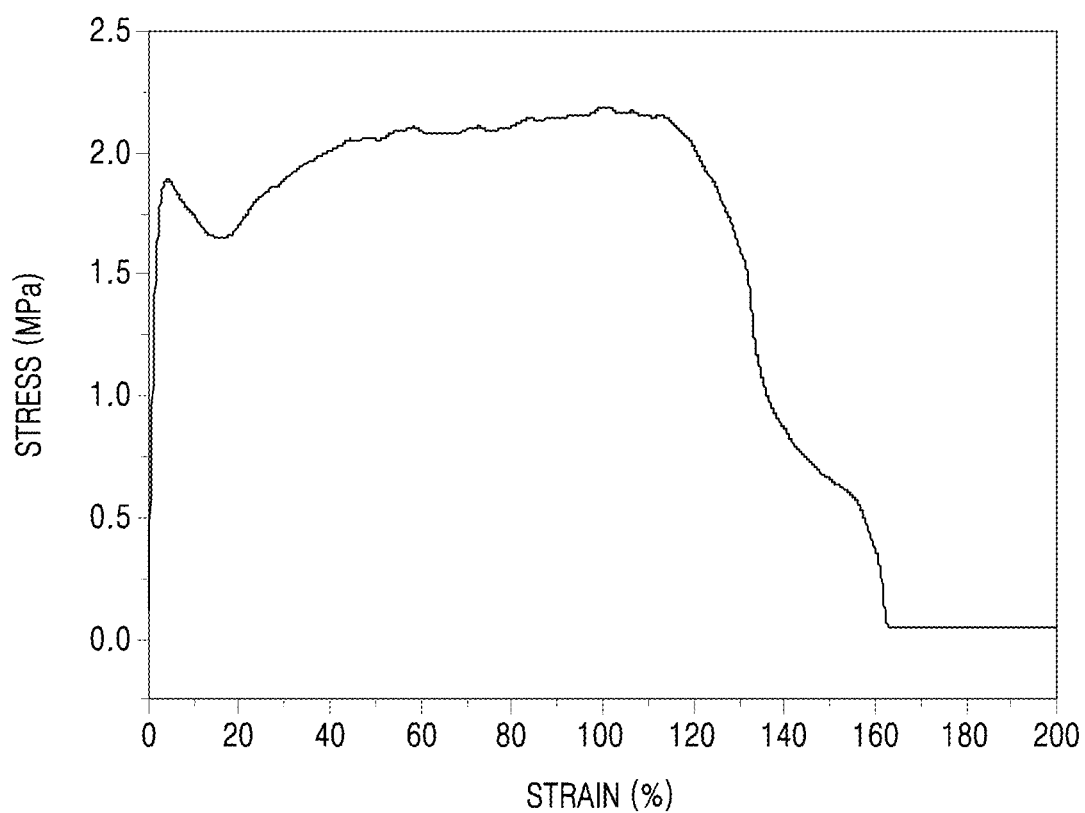
FIG. 5 is a graph of stress (megapascals, MPa) versus strain (percent, %), illustrating the mechanical properties of the copolymer film obtained according to Preparation Example 3, as measured by dynamic mechanical analysis (DMA)

Referring to FIG. 5, the copolymer film had a tensile strength of 1.7 MPa, a tensile modulus of 138.3 MPa, and a strain rate of 162.7%. Also, referring to FIG. 5, because plastic deformation was observed at a strain of about 20% or less, it was confirmed that the copolymer film had good elasticity. Based on the results, because the coating layer was not deformed and was unchanged in spite of volume changes in the positive electrode during repeated charge/discharge cycles, it was confirmed that the copolymer maintained the function of preventing a side reaction between the positive electrode and the electrolyte.

Evaluation Example 6: Charging/Discharging Characteristics According to Charge/Discharge Conditions 1) Cycle Characteristics at a Charge/discharge Rate of 0.5 C The lithium batteries prepared according to Example 1 and Comparative Example 1 were charged with a constant current at a C-rate of 0.1 C at 25° C. until a voltage reached 4.3 V (vs. Li), and then discharged with a constant current at a C-rate of 0.1 C until the voltage reached 2.5 V (vs. Li) ($1^{st}$ cycle, formation cycle).

The lithium batteries having gone through the $1^{st}$ cycle were charged with a constant current at a C-rate of 0.5 C at 25° C. until the voltage reached 4.3 V (vs. Li) and then discharged with a constant current at a C-rate of 0.5 C until the voltage reached 2.5 V (vs. Li) ($2^{nd}$ cycle).

The lithium batteries having gone through the $2^{nd}$ cycle were charged with a constant current at a C-rate of 0.5 C at 25° C. until the voltage reached 4.3 V (vs. Li) and then discharged with a constant current at a C-rate of 0.5 C until the voltage reached 2.5 V (vs. Li) ($3^{rd}$ cycle). This cycle was repeated under the same conditions up to 202 cycles.

The lithium batteries were rested for 20 minutes after every charge/discharge cycle.

Figure 6:
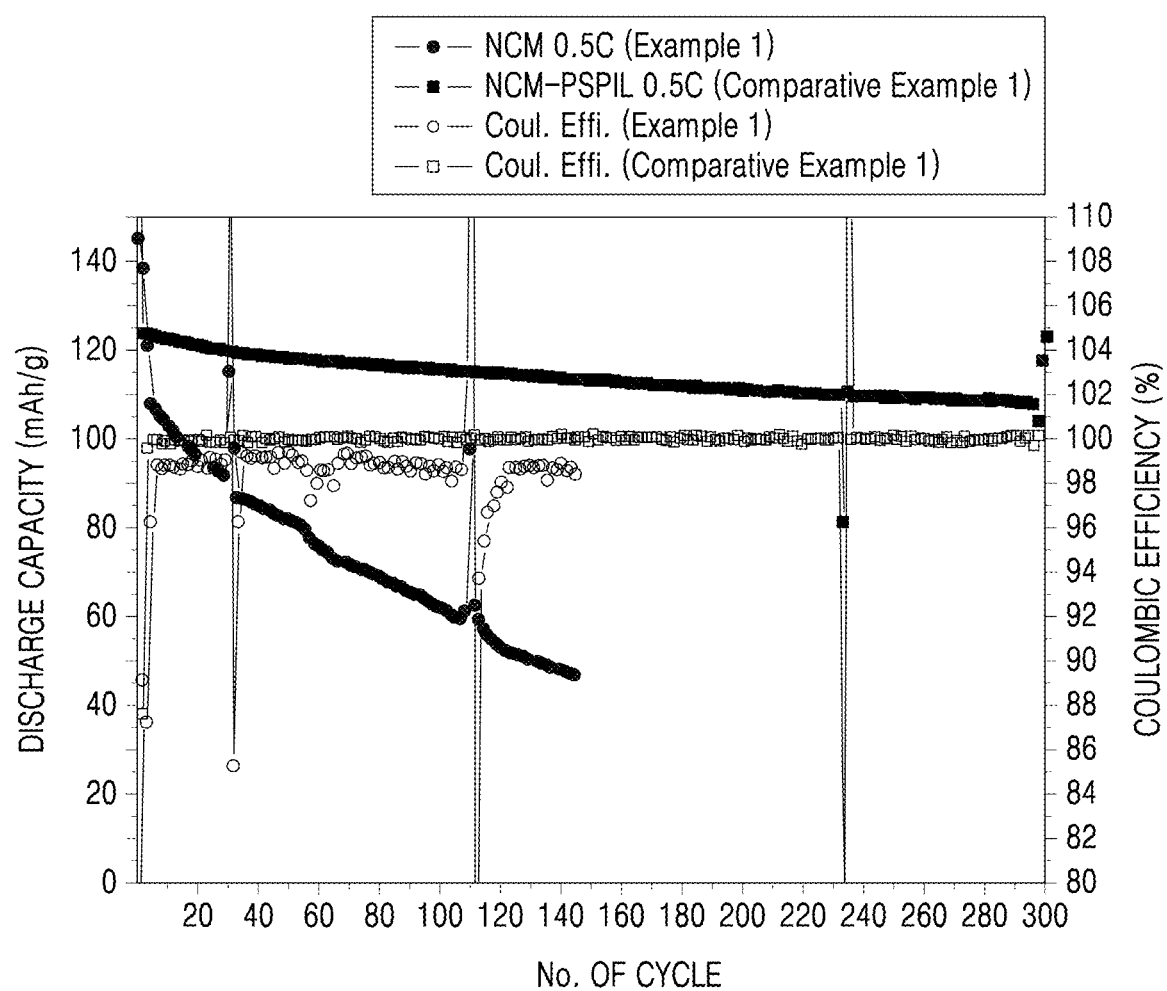
FIG. 6 is a graph of discharge capacity (milliampere hours per gram, mAh/g) and coulombic efficiency (%) versus cycle number, illustrating the cycle characteristics of lithium batteries prepared according to Example 1 and Comparative Example 1 at a charge/discharge rate of 0.5 C.

Some of charge/discharge test results are shown in FIG. 6, which also shows the Coulombic efficiency (Coul. Eff.) of each cycle. In FIG. 6, NCM 0.5 C is a result of Comparative Example 1 and NCM-PSPIL 0.5 C is a result of Example 1.

Referring to FIG. 6, although a capacity retention ratio of the lithium battery according to Comparative Example 1 decreased to 80% or less, indicating deterioration of performance before the $40^{th}$ cycle, the lithium battery according to Example 1 exhibited a discharge capacity stably maintained up to the $200^{th}$ cycle.

2) Evaluation of Cycle Characteristics at Charge/Discharge Rate of 1 C

Figure 8A:
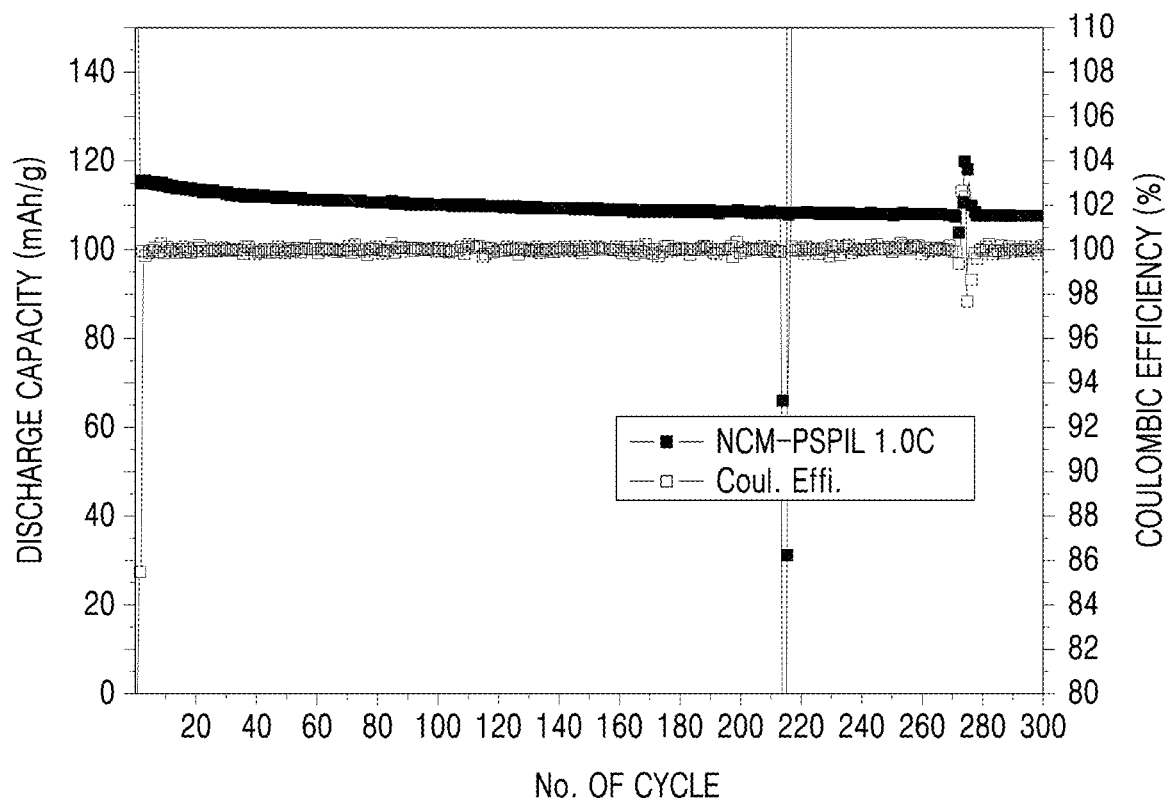
FIG. 8A is a graph of discharge capacity (mAh/g) and coulombic efficiency (Coul. Eff., %) versus cycle number, illustrating cycle characteristics results of the cell prepared according to Example 1 at a charge/discharge rate of 1 C.

Charge/discharge cycle characteristics were evaluated in the same manner as in the evaluation of cycle characteristics at a charge/discharge rate of 0.5 C, except that the charge/discharge rate at the third cycle of each of the cells according to Examples 1 to 4 was 1 C. Evaluation results are shown in FIG. 8A. FIG. 8A illustrates discharge capacity variation and Coulombic efficiency per cycle.

Referring FIG. 8A, it was confirmed that the lithium battery according to Example 1 had excellent cycle characteristics at a high charge/discharge rate of 1 C.

As a result of evaluating cycle characteristics, the cells obtained according to Examples 2 to 4 had similar cycle characteristics to those of the cell of Example 1 at a charge/discharge rate of 1 C.

Evaluation Example 7: Comparison of Discharge Capacity with Respect to Charge/Discharge Rate The lithium batteries prepared according to Example 1 and Comparative Example 1 were charged with a constant current at a C-rate of 0.1 C at 25° C. until a voltage reached 4.3 V (vs. Li), and then the lithium batteries were discharged with a constant current at a C-rate of 0.1 C until the voltage reached 2.5 V (vs. Li) ($1^{st}$ cycle, formation cycle).

The lithium batteries having gone through the $1^{st}$ cycle were charged with a constant current at a C-rate of 0.07 C at 25° C. until the voltage reached 4.3 V (vs. Li) and then discharged with a constant current at a C-rate of 0.01 C until the voltage reached 2.5 V (vs. Li) ($2^{nd}$ cycle).

Charge/discharge cycles were repeated by changing the discharge rate of the second cycle to 0.2 C, 0.7 C, or 1.0 C, respectively. The lithium batteries were rested for 20 minutes after every charge/discharge cycle.

Figure 7:
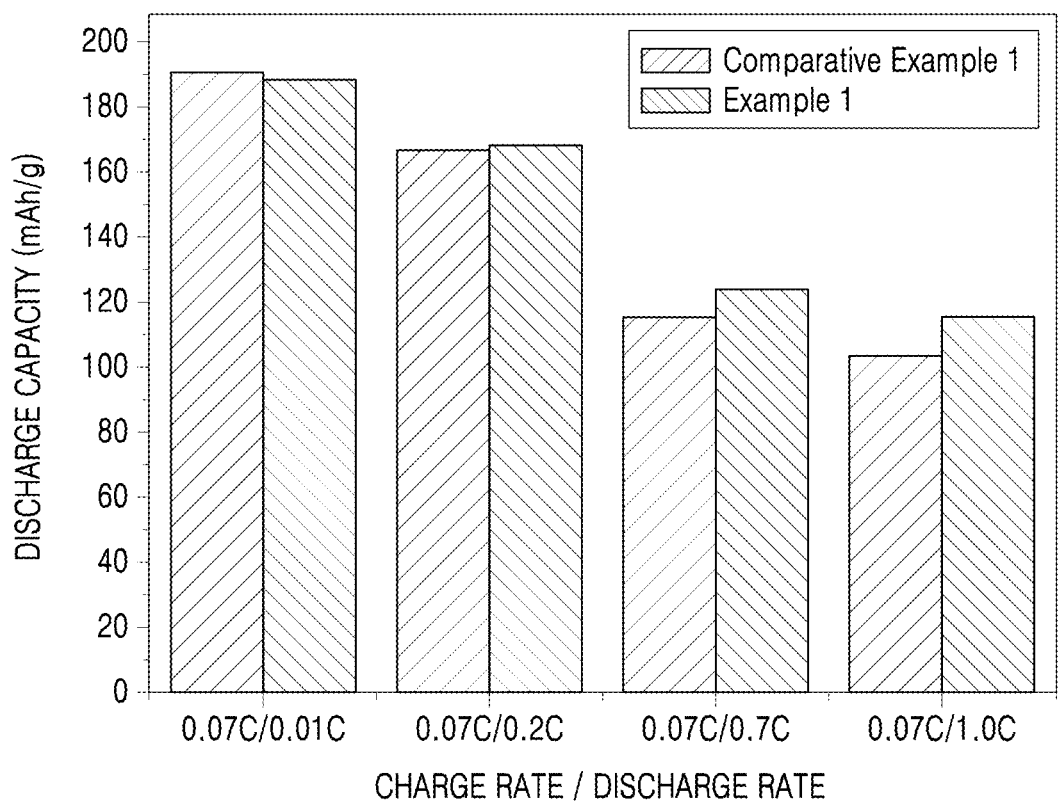
FIG. 7 is a graph of discharge capacity (mAh/g) versus the charge rate/discharge rate, illustrating the variation in ionic conductivity with a change in discharge rate of the lithium batteries prepared according to Example 1 and Comparative Example 1.

Discharge capacity with respect to discharge rate was measured in every charge/discharge cycle and shown in FIG. 7. Discharge capacity measured with respect to varying discharge rate, while the charge rate was maintained at 0.07 C, are shown in FIG. 7.

Referring to FIG. 7, although an NCM positive electrode coated with PIL showed similar discharge capacities to those of an untreated NCM positive electrode up to a discharge rate of 0.2 C, the NCM positive electrode coated with PIL exhibited increased discharge capacity at a discharge rate of 0.7 C or greater. In particular, it was confirmed that the discharge capacity increased by 12% at a discharging rate of 1.0 C.

Based on the above-described evaluation results, it was confirmed that the composite positive active material according to Example 1 is stable at a high voltage and has excellent lithium ion conductivity and excellent mechanical properties. Therefore, side reactions between the positive electrode and the sulfide-based solid electrolyte may be inhibited at a high temperature, and the function of the coating layer may be maintained without being deformed by volume changes of the positive electrode during long term charging/discharging cycles.

Evaluation Example 8: X-Ray Photoelectron Spectroscopy (XPS) Analysis

Figure 9A:
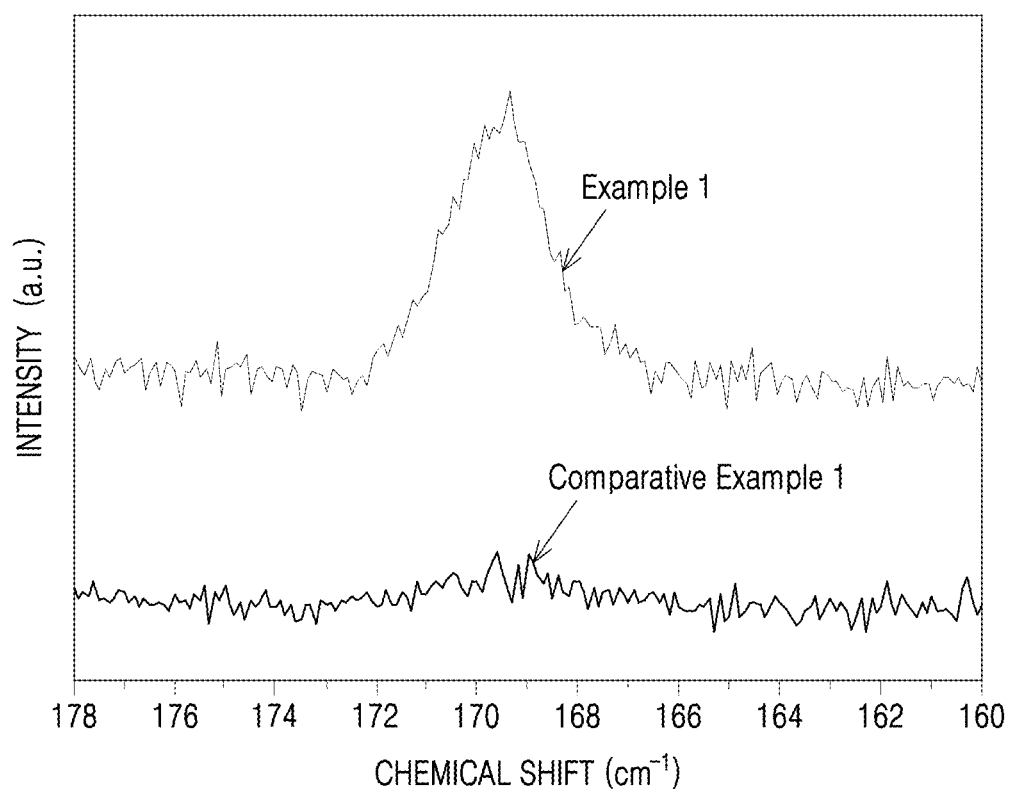
FIGS. 9A and 9B are graphs of intensity (arbitrary units, a.u.) versus chemical shift (per centimeter, cm$^{-1}$), illustrating the X-ray photoelectron spectroscopy (XPS) results of the composite positive active material according to Example 1 and Comparative Example 1.
Figure 9B:
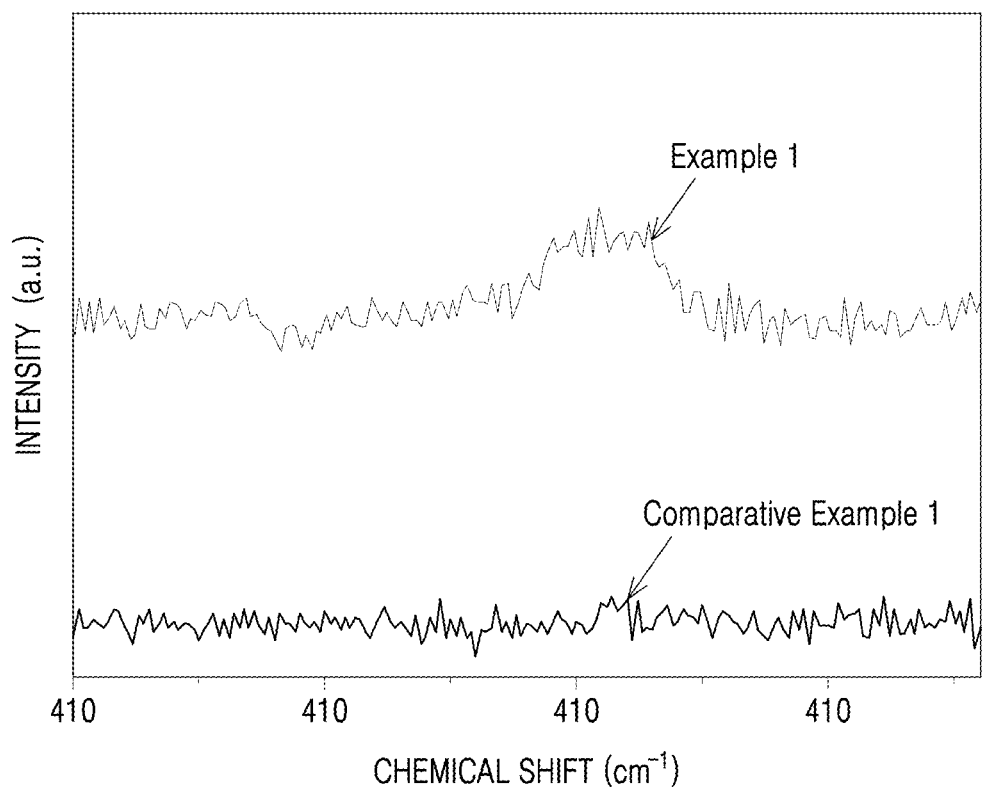

The composite positive active material according to Example 1 and $LiNi_{0.8}Co_{0.1}Mn_{0.1}O_2$ (NCM) of Comparative Example 1 were analyzed by X-ray photoelectron spectroscopy (XPS). The XPS analysis was performed by using a Quantera II XPS Scanning Microprobe (manufactured by Ulvac PHI), and analysis results are shown in FIGS. 9A and 9B. Based thereon, a synthesis process of the composite positive active material according to Example 1 into which nitrogen (N) and sulfur (S) were introduced, which is different from the process for Comparative Example 1 (NCM), was identified.

Evaluation Example 9: Charge/Discharge Cycle Characteristics

The lithium battery prepared according to Example 1 was charged with a constant current at a C-rate of 0.1 C at 25° C. until a voltage reached 4.3 V (vs. Li), and then discharged with a constant current at a C-rate of 0.1 C until the voltage reached 2.5 V (vs. Li) ($1^{st}$ cycle). This cycle was repeated under the same conditions up to a $300^{th}$ cycle.

Figure 8B:
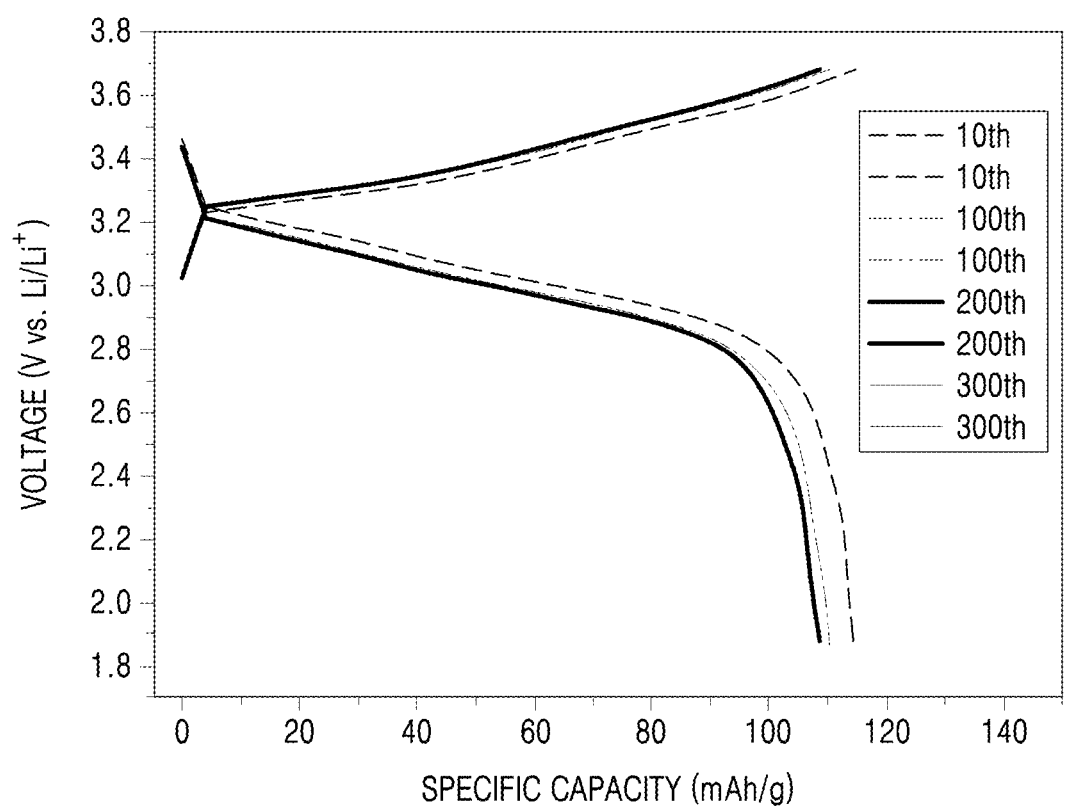
FIG. 8B is a graph of voltage (V vs Li/Li$^+$) versus specific capacity (mAh/g), illustrating the voltage variation of the lithium battery prepared according to Example 1.

Evaluation results are shown in FIG. 8B. FIG. 8B is a graph illustrating voltage variation of the lithium battery prepared according to Example 1 with respect to specific capacity.

As a result of evaluating charge/discharge cycle characteristics, the cell obtained according to Example 1 had good charge/discharge cycle characteristics.

The positive electrode including the composite positive active material according to an embodiment has electrochemical stability at a high voltage, lithium ion-delivering capability, and mechanical properties which resist volume changes. Thus, the cycle characteristics of the lithium battery including the positive electrode may be improved by having a high capacity retention ratio under charge/discharge conditions and stably maintaining the interface between the positive electrode and the solid electrolyte under long-term charging/discharging cycle environments.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will understood by those of ordinary skill in the art that various changes in form and details may be made therein without departing from the spirit and scope as defined by the following claims.

What is claimed is:

1. A positive electrode for a lithium battery comprising:
a composite material comprising a positive active material as a core of the composite material, and a coating layer located on a surface of the positive active material forming a shell on the core of the composite material, wherein the coating layer has a thickness of about 0.1 nanometer to about 100 nanometers; and wherein the coating layer comprises a copolymer comprising a first repeating unit represented by Formula 1, and a second repeating unit represented by Formula 2:

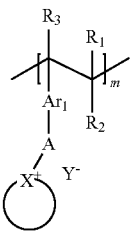

Formula 1 wherein in Formula 1, $Ar_1$ is a substituted or unsubstituted C6-C30 arylene group or a substituted or unsubstituted C6-C30 heteroarylene group, $R_1$, $R_2$, and $R_3$ are each independently hydrogen, a substituted or unsubstituted C1-C30 alkyl group, a substituted or unsubstituted C6-C30 aryl group, or a substituted or unsubstituted C3-C30 heteroaryl group, A is a bond, a substituted or unsubstituted C1-C30 alkylene group, a substituted or unsubstituted C6-C30 arylene group, a substituted or unsubstituted C3-C30 heteroarylene group, a substituted or unsubstituted C4-C30 cycloalkylene group, or a substituted or unsubstituted C3-C30 heterocycloalkylene group,

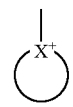

is a 3-membered to 31-membered ring system comprising 2 to 30 carbon atoms, and X is —S, —N(R), or —P(R'), R and R' are each independently hydrogen, a substituted or unsubstituted C1-C30 alkyl group, a substituted or unsubstituted C1-C30 heteroalkyl group, a substituted or unsubstituted C1-C30 alkoxy group, a substituted or unsubstituted C6-C30 aryl group, a substituted or unsubstituted C7-C30 arylalkyl group, a substituted or unsubstituted C6-C30 aryloxy group, a substituted or unsubstituted C3-C30 heteroaryl group, a substituted or unsubstituted C4-C30 heteroarylalkyl group, a substituted or unsubstituted C3-C30 cycloalkyl group, a substituted or unsubstituted C2-C30 alkenyl group, or a substituted or unsubstituted C3-C30 alkynyl group, and $Y^-$ is an anion,

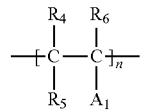

Formula 2 wherein in Formula 2, $A_l$ is a substituted or unsubstituted C6-C30 aryl group, a substituted or unsubstituted C2-C30 heteroaryl group, or —C(=O)O—(CH$_2$CH$_2$O)$_a$—R$_7$, wherein R$_7$ is hydrogen, a substituted or unsubstituted C1-C30 alkyl group, or a substituted or unsubstituted C6-C30 aryl group, and a is an integer of 1 to 10, and $R_4$, $R_5$, and $R_6$ are each independently hydrogen, a substituted or unsubstituted C1-C30 alkyl group, a substituted or unsubstituted C6-C30 aryl group, or a substituted or unsubstituted C3-C30 heteroaryl group, and in Formulae 1 and 2, m and n are mole fractions of the first repeating unit represented by Formula 1 and the second repeating unit represented by Formula 2, respectively, wherein a sum of m and n is 1, and m and n are each independently greater than 0 and less than 1.

2. The positive electrode of claim 1, wherein $Ar_1$ of Formula 1 comprises a phenylene group, a biphenylene group, a naphthalenylene group, a phenanthrenylene group, a triphenylenylene group, an anthracenylene group, a fluorenylene group, or a carbazolylene group.

3. The positive electrode of claim 1, wherein $Ar_1$ of Formula 1 is one of the groups represented by Formula 3-1, Formula 3-2, Formula 3-3, Formula 3-3, Formula 3-4, or Formula 3-5 below:

Formula 3-1
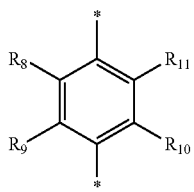

Formula 3-2
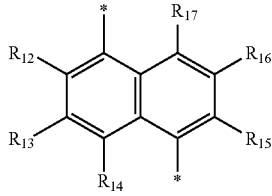

Formula 3-3
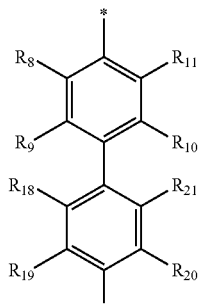

Formula 3-4
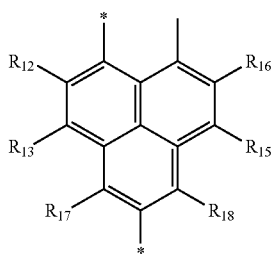

Formula 3-5
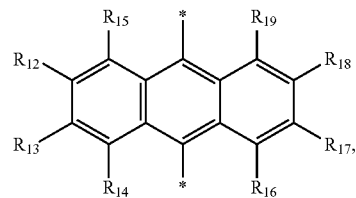

wherein in Formula 3-1, Formula 3-2, Formula 3-3, Formula 3-4, and Formula 3-5, * is a point of attachment, and $R_{11}$ to $R_{20}$ are each independently hydrogen, a substituted or unsubstituted C1-C30 alkyl group, a substituted or unsubstituted C6-C30 aryl group, or a substituted or unsubstituted C3-C30 heteroaryl group.

4. The positive electrode of claim 1, wherein

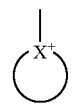

of Formula 1 comprises a group represented by Formula 4-1, Formula 4-2, Formula 4-3, Formula 4-4, or Formula 4a:

Formula 4-1
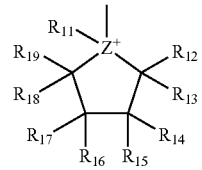

Formula 4-2
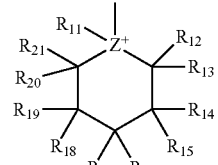

Formula 4-3
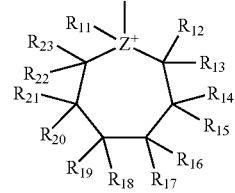

Formula 4-4
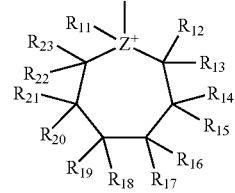

wherein in Formula 4-1, Formula 4-2, Formula 4-3, and Formula 4-4, Z is S, N, or P, and $R_{11}$ to $R_{25}$ are each independently hydrogen, a substituted or unsubstituted C1-C30 alkyl group, a substituted or unsubstituted C1-C30 alkoxy group, a substituted or unsubstituted C6-C30 aryl group, a substituted or unsubstituted C6-C30 aryloxy group, a substituted or unsubstituted C3-C30 heteroaryl group, a substituted or unsubstituted C3-C30 heteroaryloxy group, a substituted or unsubstituted C4-C30 cycloalkyl group, or a substituted or unsubstituted C3-C30 heterocycloalkyl group, wherein $R_{11}$ is absent when Z is S,

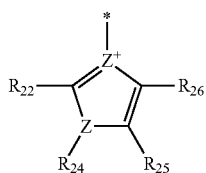

Formula 4a wherein in Formula 4a, $R_{22}$ to $R_{26}$ are defined the same as $R_{11}$ to $R_{25}$ of Formula 4-1, Formula 4-2, Formula 4-3, Formula 4-4, and Z is N.

5. The positive electrode of claim 1, wherein

of Formula 1 comprises a group represented by Formula 5-1 or Formula 5-2, and $Y^-$ in Formula 1 comprises $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^{-2}$, $ClO_4^-$, $CF_3SO_3^-$, $CF_3CO_2^-$, $(C_2F_5SO_2)_2N^-$, $(C_2F_5SO_2)(CF_3SO_2)N^-$, $(FSO_2)_2N^-$, $NO_3^-$, $Al_2C_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2C^-$, $(CF_3SO_2)_2CH^-$, $(SF_5)_3C^-$, $(O(CF_3)_2C_2(CF_3)_2O)_2PO^-$, or a combination thereof:

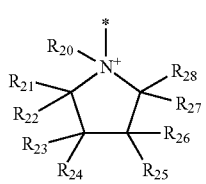

Formula 5-1

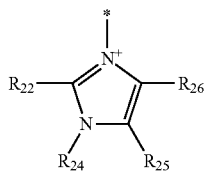

Formula 5-2 wherein in Formula 5-1 and Formula 5-2, $R_{20}$ to $R_{28}$ are each independently hydrogen, a substituted or unsubstituted C1-C30 alkyl group, a substituted or unsubstituted C1-C30 alkoxy group, a substituted or unsubstituted C6-C30 aryl group, a substituted or unsubstituted C6-C30 aryloxy group, a substituted or unsubstituted C3-C30 heteroaryl group, a substituted or unsubstituted C3-C30 heteroaryloxy group, a substituted or unsubstituted C4-C30 cycloalkyl group, or a substituted or unsubstituted C3-C30 heterocycloalkyl group.

6. The positive electrode of claim 1, wherein an amount of the copolymer in the coating layer is from about 0.1 parts by weight to about 10 parts by weight, based on 100 parts by weight of a total weight of the positive electrode.

7. The positive electrode of claim 1, wherein the copolymer comprises a random copolymer.

8. The positive electrode of claim 1, wherein a molar ratio of m to n in Formula 1 is from about 2:8 to about 5:5.

9. The positive electrode of claim 1, wherein the copolymer has a degree of polymerization of about 10 to about 5,000.

10. The positive electrode of claim 1, wherein the copolymer is represented by Formula 6 below, and has a degree of polymerization of about 10 to about 5,000:

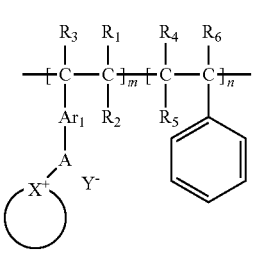

Formula 6 wherein in Formula 6, $Ar_1$ is a substituted or unsubstituted C6-C30 arylene group, $R_1$ to $R_6$ are each independently hydrogen, a substituted or unsubstituted C1-C30 alkyl group, a substituted or unsubstituted C6-C30 aryl group, or a substituted or unsubstituted C3-C30 heteroaryl group, A is a bond, a substituted or unsubstituted C1-C30 alkylene group, or a substituted or unsubstituted C6-C30 arylene group, $Y^-$ comprises $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^{2-}$, $ClO_4^-$, $CF_3SO_3^-$, $CF_3CO_2^-$, $(C_2F_5SO_2)_2N^-$, $(C_2F_5SO_2)(CF_3SO_2)N^-$, $(FSO_2)_2N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof, m and n are each independently from 0.01 to 0.99, wherein a sum of m and n is 1, and

comprises a group represented by Formula 5-1 or Formula 5-2 below,

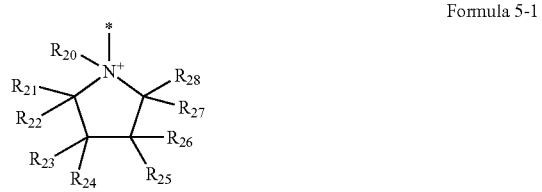

Formula 5-1

Formula 5-2

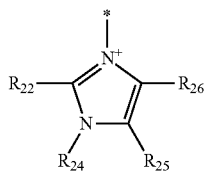

wherein in Formula 5-1 and Formula 5-2, $R_{20}$ to $R_{28}$ are each independently hydrogen, a substituted or unsubstituted C1-C30 alkyl group, a substituted or unsubstituted C1-C30 alkoxy group, a substituted or unsubstituted C6-C30 aryl group, a substituted or unsubstituted C6-C30 aryloxy group, a substituted or unsubstituted C3-C30 heteroaryl group, a substituted or unsubstituted C3-C30 heteroaryloxy group, a substituted or unsubstituted C4-C30 cycloalkyl group, or a substituted or unsubstituted C3-C30 heterocycloalkyl group, and * indicates a point of attachment.

11. The positive electrode of claim 1, wherein the copolymer is represented by Formula 7 below, and has a degree of polymerization of about 10 to about 5,000:

Formula 7

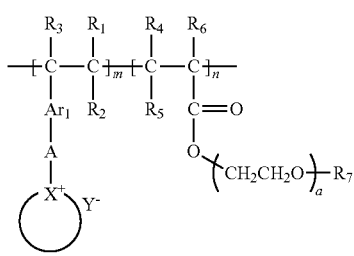

wherein in Formula 7,
Ar$_1$ is a substituted or unsubstituted C6-C30 arylene group,
R$_1$ to R$_6$ are each independently hydrogen, a substituted or unsubstituted C1-C30 alkyl group, a substituted or unsubstituted C6-C30 aryl group, or a substituted or unsubstituted C3-C30 heteroaryl group, A is a bond, a substituted or unsubstituted C1-C30 alkylene group, or a substituted or unsubstituted C6-C30 arylene group,
Y$^-$ comprises BF$_4^-$, PF$_6^-$, AsF$_6^-$, SbF$_6^-$, AlCl$_4^-$, HSO$_4^-$, CH$_3$SO$_3^-$, (CF$_3$SO$_2$)$_2$N$^-$, Cl$^-$, Br$^-$, I$^-$, SO$_4^{2-}$, ClO$_4^-$, CF$_3$SO$_3^-$, CF$_3$CO$_2^-$, (C$_2$F$_5$SO$_2$)$_2$N$^-$, (C$_2$F$_5$SO$_2$)(CF$_3$SO$_2$)N$^-$, (FSO$_2$)$_2$N$^-$, NO$_3^-$, Al$_2$Cl$_7^-$, CH$_3$COO$^-$, (CF$_3$SO$_2$)$_3$C$^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, SF$_5$CF$_2$SO$_3^-$, SF$_5$CHFCF$_2$SO$_3^-$, CF$_3$CF$_2$(CF$_3$)$_2$CO$^-$, (CF$_3$SO$_2$)$_2$CH$^-$, (SF$_5$)$_3$C$^-$, (O(CF$_3$)$_2$C$_2$(CF$_3$)$_2$O)$_2$PO$^-$, or a combination thereof,
m and n are each independently from 0.01 to 0.99, wherein a sum of m and n is 1,
R$_7$ is hydrogen, a substituted or unsubstituted C1-C30 alkyl group, or a substituted or unsubstituted C6-C30 aryl group, and a is an integer of 1 to 10, and

comprises a group represented by Formula 5-1 or Formula 5-2 below,

Formula 5-1

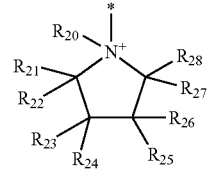

Formula 5-2

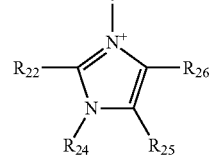

wherein in Formula 5-1 and Formula 5-2, $R_{20}$ to $R_{28}$ are each independently hydrogen, a substituted or unsubstituted C1-C30 alkyl group, a substituted or unsubstituted C1-C30 alkoxy group, a substituted or unsubstituted C6-C30 aryl group, a substituted or unsubstituted C6-C30 aryloxy group, a substituted or unsubstituted C3-C30 heteroaryl group, a substituted or unsubstituted C3-C30 heteroaryloxy group, a substituted or unsubstituted C4-C30 cycloalkyl group, or a substituted or unsubstituted C3-C30 heterocycloalkyl group, and * is a point of attachment.

12. The positive electrode of claim 1, wherein the copolymer comprises a compound represented by Formula 8, Formula 9, Formula 10, Formula 11, Formula 12, Formula 13, Formula 14, Formula 15, or a combination thereof, and a degree of polymerization of the copolymer is a about 10 to about 5,000:

Formula 8

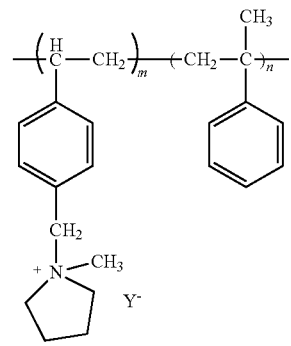

Formula 9

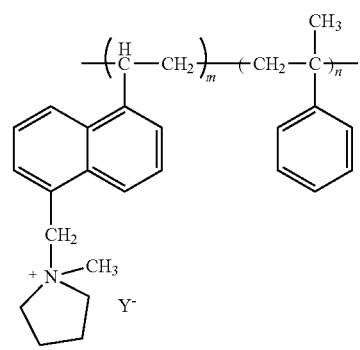

Formula 10
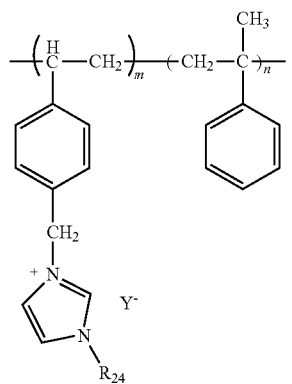

Formula 11
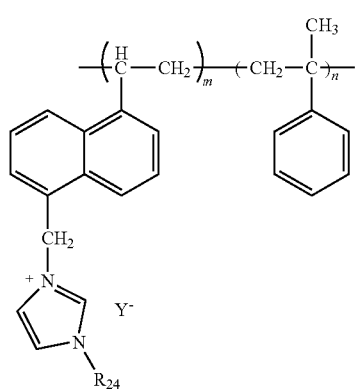

Formula 12
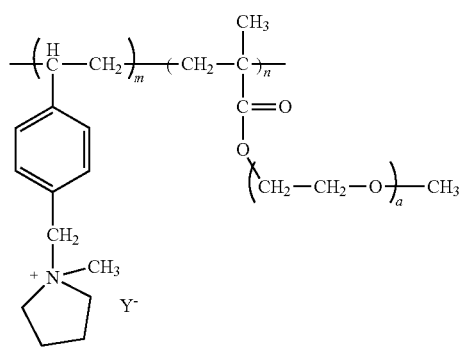

Formula 13
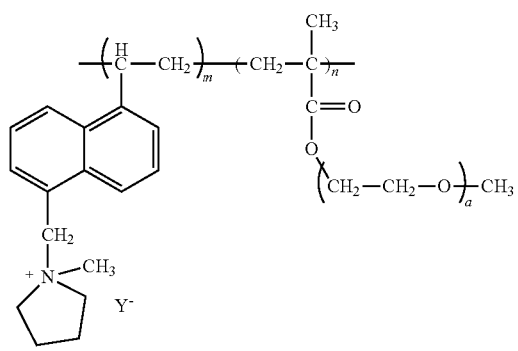

Formula 14
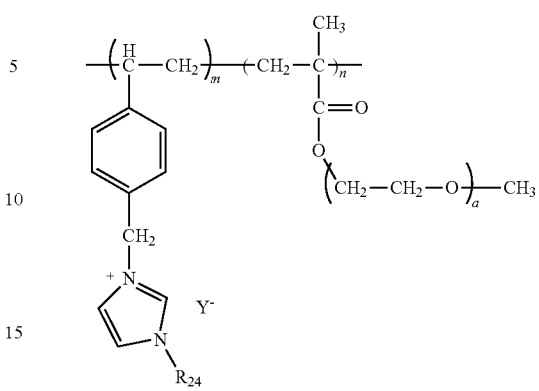

Formula 15
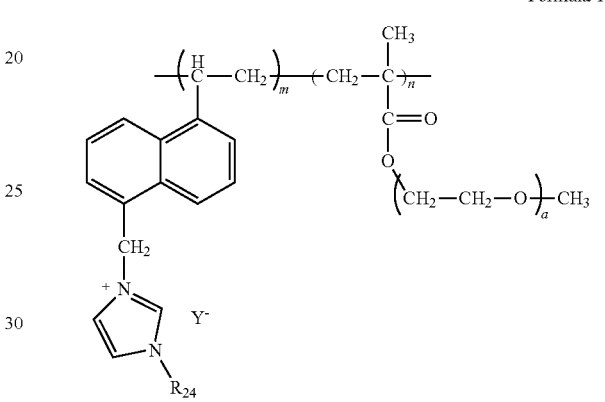

wherein in Formulas 8 to 15, $Y^-$ comprises $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^{2-}$, $ClO_4^-$, $CF_3SO_3^-$, $CF_3CO_2^-$, $(C_2F_5SO_2)_2N^-$, $(C_2F_5SO_2)(CF_3SO_2)N^-$, $(FSO_2)_2N^-$, $NO_3^-$, $Al_2Cl_7^-$, $CH_3COO^-$, $CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof, a is an integer of 1 to 10, $R_{24}$ is a C1-C10 alkyl group, m and n are each independently 0.01 to 0.99, wherein a sum of m and n is 1, and the copolymer has a degree of polymerization of about 10 to about 5000.

13. The positive electrode of claim 1, wherein the positive active material comprises a lithium nickel manganese oxide, a lithium cobalt oxide, a lithium nickel cobalt manganese oxide, a lithium nickel cobalt aluminum oxide, a lithium phosphate iron oxide, an overlithiated layered oxide, or a combination thereof.

14. The positive electrode of claim 1, wherein the coating layer further comprises a lithium salt.

15. The positive electrode of claim 13, wherein an amount of the lithium salt is in a range of about 0.1 part by weight to about 90 parts by weight, based on 100 parts by weight of the coating layer, and wherein the lithium salt comprises LiSCN, $LiN(CN)_2$, $Li(CF_3SO_2)_3C$, $LiC_4F_9SO_3$, $LiN(SO_2CF_2CF_3)_2$, LiCl, LiF, LiBr, LiI, $LiB(C_2O_4)_2$, $LiBF_4$, $LiBF_3(C_2F_5)$, lithium bis(oxalato) borate, lithium oxalyldifluoroborate, lithium difluoro(oxalato)borate, lithium bis(trifluoro methanesulfonyl)imide, lithium bis(fluorosulfonyl)imide, LiCF$_3$SO$_3$, LiAsF$_6$, LiSbF$_6$, LiClO$_4$, or a combination thereof.

16. The positive electrode of claim 1, wherein the coating layer has a thickness of about 0.5 nanometer to about 50 nanometers.

17. The positive electrode of claim 1, further comprising a binder comprising a sulfide electrolyte, an oxide electrolyte, or a combination thereof.

18. The positive electrode of claim 17, wherein the sulfide electrolyte comprises a compound represented by Formula 16 below:

Li$_a$M$_b$PS$_c$A$_d$  Formula 16 wherein in Formula 16,

0<a≤6, 0≤b≤6, 0<c<6, and 0≤d≤6;

M is Ge, Sn, or Si; and

A is F, Cl, Br, or I.

19. The positive electrode of claim 1, further comprising a conductive agent comprising a carbon nanofiber, graphite, carbon black, graphene, or a combination thereof.

20. A lithium battery comprising:

a positive electrode;

a negative electrode; and a solid electrolyte interposed between the positive electrode and the negative electrode and comprising a sulfide solid electrolyte, an oxide solid electrolyte, or a combination thereof, the positive electrode comprising:

a composite material comprising a positive active material as a core of the composite material, and a coating layer located on a surface of the positive active material forming a shell on the core of the composite material, wherein the coating layer comprises a copolymer comprising a first repeating unit represented by Formula 1, and a second repeating unit represented by Formula 2:

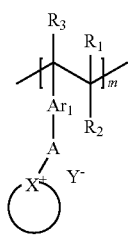

Formula 1 wherein in Formula 1,

Ar$_1$ is a substituted or unsubstituted C6-C30 arylene group or a substituted or unsubstituted C6-C30 heteroarylene group, R$_1$, R$_2$, and R$_3$ are each independently hydrogen, a substituted or unsubstituted C1-C30 alkyl group, a substituted or unsubstituted C6-C30 aryl group, or a substituted or unsubstituted C3-C30 heteroaryl group, A is a bond, a substituted or unsubstituted C1-C30 alkylene group, a substituted or unsubstituted C6-C30 arylene group, a substituted or unsubstituted C3-C30 heteroarylene group, a substituted or unsubstituted C4-C30 cycloalkylene group, or a substituted or unsubstituted C3-C30 heterocycloalkylene group,

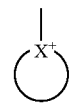

is a 3-membered to 31-membered ring system comprising 2 to 30 carbon atoms, and X is —S, —N(R), or —P(R'), R and R' are each independently hydrogen, a substituted or unsubstituted C1-C30 alkyl group, a substituted or unsubstituted C1-C30 heteroalkyl group, a substituted or unsubstituted C1-C30 alkoxy group, a substituted or unsubstituted C6-C30 aryl group, a substituted or unsubstituted C7-C30 arylalkyl group, a substituted or unsubstituted C6-C30 aryloxy group, a substituted or unsubstituted C3-C30 heteroaryl group, a substituted or unsubstituted C4-C30 heteroarylalkyl group, a substituted or unsubstituted C3-C30 cycloalkyl group, a substituted or unsubstituted C2-C30 alkenyl group, or a substituted or unsubstituted C3-C30 alkynyl group, and Y$^-$ is an anion,

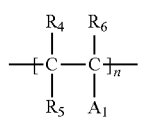

Formula 2 wherein in Formula 2,

A$_1$ is a substituted or unsubstituted C6-C30 aryl group, a substituted or unsubstituted C2-C30 heteroaryl group, or —C(=O)O—(CH$_2$CH$_2$O)$_a$-R$_7$, wherein R$_7$ is hydrogen, a substituted or unsubstituted C1-C30 alkyl group, or a substituted or unsubstituted C6-C30 aryl group, and a is an integer of 1 to 10, and R$_4$, R$_5$, and R$_6$ are each independently hydrogen, a substituted or unsubstituted C1-C30 alkyl group, a substituted or unsubstituted C6-C30 aryl group, or a substituted or unsubstituted C3-C30 heteroaryl group, and in Formulae 1 and 2, m and n are mole fractions of the first repeating unit represented by Formula 1 and the second repeating unit represented by Formula 2, respectively, wherein a sum of m and n is 1, and m and n are each independently greater than 0 and less than 1.

21. The lithium battery of claim 20, wherein the sulfide solid electrolyte comprises Li$_2$S—P$_2$S$_5$, Li$_2$S—P$_2$S$_5$—LiX where X is I, Cl, or Br, Li$_2$S—P$_2$S$_5$—Li$_2$O, Li$_2$S—P$_2$S$_5$—Li$_2$O—LiI, Li$_2$S—SiS$_2$, Li$_2$S—SiS$_2$—LiI, Li$_2$S—SiS$_2$—LiBr, Li$_2$S—SiS$_2$—LiCl, Li$_2$S—SiS$_2$—B$_2$S$_3$—LiI, Li$_2$S—SiS$_2$—P$_2$S$_5$-LiI, Li$_2$S—B$_2$S$_3$, Li$_2$S—P$_2$S$_5$—Z$_x$S$_x$ where x and x are each independently a positive number, and Z is Ge, Zn, or Ga, Li$_2$S—GeS$_2$, Li$_2$S—SiS$_2$—Li$_3$PO$_4$, Li$_2$S—SiS$_2$—Li$_p$MO$_q$ where p and q are each independently a positive number, and M is P, Si, Ge, B, Al, Ga, or In) a compound represented by Formula 16 below, or a combination thereof:

Li$_a$M$_b$PS$_c$A$_d$  Formula 16 wherein in Formula 16,

0<a≤6, 0<b≤6, 0<c<6, and 0≤d≤6;

M is Ge, Sn, or Si; and

A is F, Cl, Br, or I.

22. The lithium battery of claim 20, wherein the negative electrode comprises a lithium metal or a lithium metal alloy.

23. The lithium battery of claim 20, wherein the negative electrode comprises a negative active material comprising carbon, silicon, a silicon oxide, a silicon alloy, a silicon-carbon composite, tin, a tin alloy, a tin-carbon composite, a metal alloyable with lithium, an alloy thereof or an oxide of the alloy, or a combination thereof.

24. The lithium battery of claim 20, wherein the lithium battery is an all solid battery.

\* \* \* \* \*